(12) United States Patent
Cohen

(10) Patent No.: US 7,742,587 B2
(45) Date of Patent: Jun. 22, 2010

(54) TELECOMMUNICATIONS AND CONFERENCE CALLING DEVICE, SYSTEM AND METHOD

(76) Inventor: Alon Cohen, 4 Thatcher Rd., Tenafly, NJ (US) 07670

( * ) Notice: Subject to any disclaimer, the term of this patent is extended or adjusted under 35 U.S.C. 154(b) by 1772 days.

(21) Appl. No.: 10/303,088

(22) Filed: Nov. 25, 2002

(65) Prior Publication Data

US 2003/0112947 A1 Jun. 19, 2003

Related U.S. Application Data

(63) Continuation-in-part of application No. PCT/IL01/00484, filed on May 24, 2001.

(51) Int. Cl.
 H04M 3/42 (2006.01)
 H04M 1/00 (2006.01)
 G10L 21/00 (2006.01)
 G06F 15/16 (2006.01)

(52) U.S. Cl. ............. 379/202.01; 379/158; 379/203.01; 379/204.01; 704/275; 709/204

(58) Field of Classification Search ............ 379/202.01, 379/158, 164, 203.01, 204.01; 709/204; 704/270, 275; 370/260; 710/305; 700/94
 See application file for complete search history.

(56) References Cited

U.S. PATENT DOCUMENTS

| 4,002,857 | A | * | 1/1977 | Herlacher | 379/158 |
|---|---|---|---|---|---|
| 5,434,860 | A | | 7/1995 | Riddle | |
| 5,483,588 | A | | 1/1996 | Eaton et al. | |
| 5,533,112 | A | | 7/1996 | Danneels | |
| 5,539,741 | A | | 7/1996 | Barraclough et al. | |
| 5,619,555 | A | | 4/1997 | Fenton et al. | |
| 5,734,724 | A | | 3/1998 | Kinoshita et al. | |
| 5,740,384 | A | * | 4/1998 | Asthana et al. | 710/305 |
| 5,745,711 | A | | 4/1998 | Kitahara et al. | |
| 5,844,979 | A | | 12/1998 | Raniere et al. | |
| 5,852,656 | A | | 12/1998 | Sato et al. | |
| 5,884,262 | A | | 3/1999 | Wise et al. | |
| 5,916,302 | A | | 6/1999 | Dunn et al. | |
| 6,007,228 | A | | 12/1999 | Agarwal et al. | |
| 6,148,068 | A | * | 11/2000 | Lowery et al. | 379/202.01 |
| 6,167,033 | A | | 12/2000 | Chang et al. | |
| 6,175,619 | B1 | | 1/2001 | DeSimone | |
| 6,240,070 | B1 | | 5/2001 | Kozdon et al. | |
| 6,421,643 | B1 | * | 7/2002 | Kahn et al. | 704/270 |

(Continued)

OTHER PUBLICATIONS

Begault, "*Auditory and Non-Auditory Factors that Potentially Influence Virtual Acoustic Imagery*", AES 16th International Conference on Spatial Sound Reproduction, 1999, pp. 1- 14.

Griesinger, "*Objective Measures of Spaciousness and Envelopment*", AES 16th International Conference on Spatial Sound Reproduction, 1999, pp. 1-15.

(Continued)

*Primary Examiner*—Thjuan K Addy
(74) *Attorney, Agent, or Firm*—Schwabe, Williamson & Wyatt

(57) ABSTRACT

A communications system and method, which may be used, for example, within a conferencing communication system, is provided. A plurality of communicators may transmit, via a network, audio streams bound from any other communicator. A server receives from the plurality of communicators a plurality of incoming streams and for each communicator transmits any mixed combination of the incoming streams. The system also may control any of the mixers to independently control a volume level of any of the incoming streams being mixed at any of the mixers to create the required mixed combination of the incoming streams. Various conference call features may be effected using such mix capacities.

42 Claims, 12 Drawing Sheets

U.S. PATENT DOCUMENTS

| | | | |
|---|---|---|---|
| 6,501,739 B1 | 12/2002 | Cohen | |
| 6,628,768 B1* | 9/2003 | Ramaswamy et al. | 379/202.01 |
| 6,940,826 B1* | 9/2005 | Simard et al. | 370/260 |
| 7,006,616 B1* | 2/2006 | Christofferson et al. | 379/202.01 |
| 7,236,580 B1* | 6/2007 | Sarkar et al. | 379/202.01 |
| 2002/0013813 A1* | 1/2002 | Matsuoka | 709/204 |
| 2002/0123895 A1* | 9/2002 | Potekhin et al. | 704/275 |
| 2003/0182001 A1* | 9/2003 | Radenkovic et al. | 700/94 |
| 2006/0067500 A1* | 3/2006 | Christofferson et al. | 379/202.01 |

OTHER PUBLICATIONS

International Search Report PCT/IL01/00484 dated Nov. 15, 2001.

Office communication in U.S. Appl. No 09/577,815 dated Oct. 24, 2001.

Office Action, dated Oct. 24, 2001 in related U.S. Appl. No. 09/577,815.

Office Action, dated Apr. 8, 2002 in related U.S. Appl. No. 09/577,815.

Notice of Allowability; Reasons for Allowability, in related U.S. Appl. No. 09/577,815 dated Aug. 14, 2002.

* cited by examiner

TELECOMMUNICATIONS AND CONFERENCE CALLING DEVICE, SYSTEM AND METHOD

PRIOR APPLICATION DATA

The present application is a continuation-in-part of International Application PCT/IL01/00484 filed on May 24, 2001 entitled "PARTICIPANT-CONTROLLED CONFERENCE CALLING SYSTEM", which claims priority from U.S. application Ser. No. 09/577,815 filed on May 25, 2000 entitled "PARTICIPANT-CONTROLLED CONFERENCE CALLING SYSTEM".

FIELD OF THE INVENTION

The present invention is directed to conference calling and in particular to devices, systems and methods for participant-controlled conference calling.

BACKGROUND OF THE INVENTION

In today's business world, conferencing and meetings involving multiple participants are commonplace. Moreover, business people are often forced to work in teams, as each team member brings a different skill to the team. This fact, coupled with the globalization of business, necessitates that communications systems be able to accommodate multiple participants who may be at different physical locations, far apart from one another.

Electronic mail, or e-mail, is one solution to this problem. E-mail messages may be sent to one, some, or all members in a work group, allowing the work group dynamic to be customized to the task at hand. However, not all participants read their e-mail diligently or in a timely fashion. This often results in delays, as e-mail messages flow back and forth without immediate responses. Also, the quality of e-mail-based multi-party collaboration may result in an inferior work product as people tend to express their thoughts better orally than through written communications, and because the number of e-mail messages increases exponentially as the number of work group participants increases, as does the time spent writing, sending, receiving, and reading e-mail messages.

Business telephone conference calling systems, including video conferencing systems, do not suffer from the communication delays inherent in e-mail systems, as the conferences are in real time. However, like Internet chat rooms, there are no provisions for selective filtering of incoming communications on a per-user basis within the context of the teleconference, particularly as all communications are managed by a common mixer. Thus all participants may speak at the same time and all participants hear all of what is being said. Should two or more participants wish to conference privately, they must invite each other in front of all other participants, and, thus, participants are sometimes hesitant to do this as this is impolite. Similarly, two participants who are in the same room and wish to talk privately must leave the telephone conference and speak outside the conference or outside the range of the telephone. Again, this maybe seen as impolite.

What is needed is a telephone conferencing system that allows multiple parties to simulate a conference room or work group environment within which each party controls who they speak with and who they listen to while maintaining the cohesiveness of the group dynamic.

SUMMARY OF THE INVENTION

The present invention seeks to provide an improved conference calling system in which each participant may individually control incoming audio streams from other participants, and in which participants may communicate with each other within the context of the conference call with some or a full degree of privacy.

There is thus provided, in accordance with a preferred embodiment of the present invention, a conferencing communication system capable of carrying on a telephone conference including at least one participant listening to the telephone conference and at least one additional audio source at a first volume level. The participant is operative to semi-detach from the telephone conference, either receive or initiate a call to an external party while still being able to hear the telephone conference at a second volume level, communicate with the external party at a third volume level, and upon disconnecting from the external party, re-attach to the telephone conference at any of the volume levels and a fourth volume level.

Furthermore, in accordance with a preferred embodiment of the present invention, the conferencing communication system includes a communications system.

In addition, there is also provided, in accordance with a preferred embodiment of the present invention, a communications system, which includes at least one communications network; a plurality of communicators connectable to the at least one communications network, each of the communicators being operative to transmit, via the network audio streams bound from any of the plurality of communicators; a plurality of mixers. Each of the mixer output associated with one of the communicators is operative to receive from the plurality of communicators a plurality of incoming streams bound from the communicators to the mixer and transmit any mixed combination of the incoming streams to the communicator associated with the mixer. The system also includes means for controlling any of the mixers to independently control a volume level of any of the incoming streams being mixed at any of the mixers to create the required mixed combination of the incoming streams.

Furthermore, in accordance with a preferred embodiment of the present invention, the communicators include means for independently controlling any of the mixers. The communicators may also be a second system Furthermore, in accordance with a preferred embodiment of the present invention, the communications system further includes a communications server. The server includes at least one interface to a communications network, the network being in communication with the communicators. The mixers are located within the server.

The communicators may also be a second system.

Furthermore, in accordance with a preferred embodiment of the present invention, the means for controlling is operative to control an associated mixer of a first of the communicators to control the volume level of the incoming streams such that the first communicator receives the output stream from the associated mixer, the output being a mix of incoming streams from a second of the communicators at a first volume level and all other of the incoming streams at a second volume level.

Furthermore, in accordance with a preferred embodiment of the present invention, the means for controlling is operative to control an associated mixer of a first of the communicators to control the volume level of the incoming streams such that the first communicator receives the output stream from the associated mixer, the output being a mix of incoming streams from a second of the communicators at a first volume level only.

Furthermore, in accordance with a preferred embodiment of the present invention, the means for controlling is operative to control any of the mixers to control the volume level of the incoming streams such that any other of the communicators other than the first and second communicators do not receive the incoming streams from the first and second communicators.

Furthermore, in accordance with a preferred embodiment of the present invention, the second communicator only receives the incoming stream from the first communicator.

Furthermore, in accordance with a preferred embodiment of the present invention, the means for controlling is operative to control any of the mixers to control the volume level of the incoming streams such that all of the communicators other than the second communicator receives the incoming streams from all of the communicators, and the second communicator only receives the incoming stream from the first communicator.

Furthermore, in accordance with a preferred embodiment of the present invention, the means for controlling is operative to connect any of the plurality of communicators to already connected communicators.

Furthermore, in accordance with a preferred embodiment of the present invention, the mixer is operative to control the volume level of at least one additional incoming stream, according to the input level of any other incoming streams bound for the mixer. The volume level is set to a first volume level in the absence of any other of the incoming streams bound for the mixer, and the volume level is set to a second volume level in the presence of any other of the incoming streams bound for the mixer.

Furthermore, in accordance with a preferred embodiment of the present invention, the mixer is operative to separate any of the input audio streams into a plurality of frequencies and independently control a volume level of any of the frequencies.

Furthermore, in accordance with a preferred embodiment of the present invention, the communications system further includes means for reestablishing a connection between one of the communicators connected to the system upon disconnection of the communicator from the system.

Furthermore, in accordance with a preferred embodiment of the present invention, the communications system further includes means for reestablishing a connection between one of the communicators connected to the system upon disconnection of the communicator from the system, the means for reestablishing using a list of caller IDs associated with the user of the communicator, such that the list of IDs may contain the caller ID and communicator type last used by a user prior to the disconnection.

Furthermore, in accordance with a preferred embodiment of the present invention, any of the mixers is operative to receive a text message and further includes means for converting the text message to an audio message. Also, any of the mixers is operative to receive a pointer to a list consisting of sets including pairs of pre-set text messages, their corresponding audio and graphic representations, such that the pre-recorded message is sent to the communicator and corresponding text message is sent to the controlling means. Such a list of text messages may be stored, for example, at a database at a server.

Further, any of the mixers is operative to receive a pointer to the list and further includes means for converting the pre-set text message to an audio message and for converting a text message from the controlling means to an audio message. Furthermore, any of the mixers further includes means for converting any of the audio streams into a text message.

Furthermore, in accordance with a preferred embodiment of the present invention, the means for controlling is operative to prevent an outgoing message from a first of the communicators from being received by any of the mixers. Further, the means for controlling is operative to prevent any of the incoming streams from being received by a first of the mixers, or prevent an outgoing message from a first of the communicators from being received by any of the mixers, and prevent any of the incoming streams from being received by a first of the mixers.

Furthermore, in accordance with a preferred embodiment of the present invention, the means for controlling is operative to prevent any of the communicators from receiving an in-band audio signaling tone sent by any of the communicators.

Furthermore, in accordance with a preferred embodiment of the present invention, any of the mixers is operative to retransmit any of the previously-transmitted streams, and/or to retransmit any of the previously-transmitted streams concurrent with the any of the mixers currently transmitting any of the streams not previously transmitted.

Furthermore, in accordance with a preferred embodiment of the present invention, any of the streams are transmitted via any one of a group including voice over IP (VoIP) system, voice over DSL (VoDSL) system and voice over data.

Furthermore, in accordance with a preferred embodiment of the present invention, the communicator is operative to cause the server to aurally provide an identification. The means for controlling is operative to provide the identification to the server upon entry of the identification at the means for controlling, and the server is operative to associate the communicator with the means for controlling using the identification.

Furthermore, in accordance with a preferred embodiment of the present invention, the means for controlling is operative to cause the server to provide an identification. In this case, the communicator is operative to provide the identification to the server upon entry of the identification at the communicator, and the server is operative to associate the communicator with the means for controlling using the identification.

Furthermore, in accordance with a preferred embodiment of the present invention, the means for controlling is operative to cause the server to provide an identification. The means for controlling is operative to audibly provide in-band signals representing the identification to the communicator, the communicator is operative to provide the identification to the server, and the server is operative to associate the communicator with the means for controlling using the identification.

In addition, in accordance with a preferred embodiment of the present invention, the communications system further includes a plurality of microphones connected to one of the communicators, wherein at least one of the microphones is responsive to a far audio field and at least one of the microphones is responsive to a near audio field; and a plurality of Automatic Gain Controls (AGC) assembled with input circuitry of the communicator wherein each of the microphones is connected to a separate one of the AGCs, and wherein inputs from both microphones are added via a mixer to the microphone input of the communicator.

Alternatively, in accordance with a preferred embodiment of the present invention, the communications system further includes a plurality of microphones connected to one of the communicators, wherein at least two of the microphones receive audio input in a different frequency range, and wherein the means for controlling is operative to control the mixers to split the audio stream from the communicator into the different frequency ranges and control a volume level of each of the frequency ranges independently.

Furthermore, in accordance with a preferred embodiment of the present invention, the system further includes indication means for either of vocally and visually indicating to each user the status of any of the participants. Any of the mixers is operative to retransmit any of the previously-transmitted streams at a first retransmission speed concurrently with a currently-transmitted stream at a different speed than the first transmission speed.

One embodiment of the system and method of the present invention provides for a conference call server allowing a plurality of communications devices to communicate, the server comprising a controller operative to receive a set of incoming audio streams and output a plurality of combinations of said incoming streams, each combination being output to a communications device; and for each of a set of communications devices, accept a text message, convert said text message to an audio message and add the audio message to the combination for the communications device. In further embodiments, such a server may comprise a set of mixers, each mixer associable with a communications device. In such a server the controller may be operative to receive a signal associated with a communications device, and in response, alter the volume level of the audio message. Such a server may comprise a database storing a set of text messages, wherein said text message is received from said database. In such a server the controller may be operative to receive a text message from a communications device. In such a server the controller may be operative to receive a text message from a terminal associated with a communications device.

One embodiment of the system and method of the present invention provides for a method for allowing a plurality of communications devices to communicate, the method comprising: receiving a set of incoming audio streams and outputting a plurality of combinations of said incoming streams, each combination being output to a communications device; and for each of a set of the communications devices, accepting a text message, converting said text message to an audio message and adding the audio message to the combination for that communications device. Such a method may comprise receiving a signal associated with a communications device, and in response, altering the volume level of the audio message. Such a method may comprise storing a set of text messages in a database, wherein said text message is received from said database. Such a method may comprise receiving a text message from a communications device. Such a method may comprise receiving a text message from a terminal associated with a communications device.

One embodiment of the system and method of the present invention provides for a communications device comprising: a speaker; a first microphone sensitive to a first set of frequencies, the first microphone associated with an automatic gain control circuit; and a second microphone sensitive to a second set of frequencies. The device may further comprise a touchtone keypad. In such a device the first set of frequencies and second set of frequencies may not be contiguous. In such a device the first set of frequencies and second set of frequencies may be at least partially contiguous. The device may further comprise a speaker. In such a device the second microphone may be associated with an automatic gain control circuit. In such a device the first microphone may output a first signal and the second microphone may output a second signal, and the communications device may comprise a controller operative to transmit the first signal and the second signal. In such a communications device the first microphone may be sensitive to frequencies in the range of approximately 300 Hz-1500 Hz. In such a communications device, the second microphone may be sensitive to a set of frequencies above approximately 1500 Hz. In such a communications device, the first and second set of frequencies may be such that the first microphone is more sensitive than the second microphone to a near audio field.

One embodiment of the system and method of the present invention provides for a conference call server allowing a plurality of communications devices to communicate, the server comprising: at least one mixer capable of: receiving a set of incoming audio streams and outputting a plurality of combinations of said incoming streams, each combination being output to a communications device; and for at least a first communications device, receiving a set of second communications device inputs, each second communications device input received from a different microphone among a plurality of microphones at a second communications device, and selectively combining the set of second communications device inputs within the combination output to the first communications device. In such a server the mixer may be operative, on the receipt of a signal associated with a communications device, to set a first set of incoming streams from a first set of microphones which are output to said communications device to a first volume level and set a second set of incoming streams from a second set of microphones which are output to said communications device to a second volume level. In such a server the signal associated with a communications device may be received from the communications device. In such a server the signal associated with a communications device may be received from a terminal associated with the communications device. In such a server at least one microphone among the plurality of microphones may be associated with an automatic gain control circuit. In one embodiment at least one microphone among the plurality of microphones is sensitive to frequencies in the range of approximately 300 Hz-1500 Hz. In one embodiment at least one microphone among the plurality of microphones is sensitive to a set of frequencies above approximately 1500 Hz. In one embodiment at least one microphone among the plurality of microphones is more sensitive than at least a second microphone to a near audio field. In one embodiment comprising a plurality of mixers, each mixer is associated with a communications device. In one embodiment for at least a first microphone and a second microphone among the plurality of microphones, the first microphone is sensitive to a first range and the second microphone is second to a second range, the first range and second range being at least partially contiguous. In one embodiment for at least a first microphone and a second microphone among the plurality of microphones, the first microphone is sensitive to a first range and the second microphone is second to a second range, the first range and second range being not contiguous.

One embodiment of the system and method of the present invention provides for a method for allowing a plurality of communications devices to communicate, the method comprising: receiving a set of incoming audio streams and outputting a plurality of combinations of said incoming streams, each combination being output to a communications device; for at least a first communications device, receiving a set of second communications device inputs, each second communications device input received from a different microphone of a plurality of microphones at a second communications device; and selectively combining the set of second communications device inputs within the combination output to the first communications device. In one embodiment the method comprises: on the receipt of a signal associated with a communications device, setting a first set of incoming streams from a first set of microphones which are output to said communications device to a first volume level and setting a second set of incoming streams from a second set of microphones which are output to said communications device to a second volume level. In one embodiment said signal associated with a communications device is received from the communications device. In one embodiment said signal associated with a communications device is received from a terminal associated with the communications device. In one embodiment at least one microphone among the plurality of microphones is associated with an automatic gain control circuit. In one embodiment at least one microphone among the plurality of microphones is sensitive to frequencies in the range of approximately 300 Hz-1500 Hz. In one embodiment at least one microphone among the plurality of microphones is sensitive to a set of frequencies above approximately 1500 Hz. In one embodiment at least one microphone among the plurality of microphones is more sensitive than at least a second microphone to a near audio field. In one embodiment for at least a first microphone and a second microphone among the plurality of microphones, the first microphone is sensitive to a first range and the second microphone is second to a second range, the first range and second range being at least partially contiguous. In one embodiment for at least a first microphone and a second microphone among the plurality of microphones, the first microphone is sensitive to a first range and the second microphone is second to a second range, the first range and second range being not contiguous.

One embodiment of the system and method of the present invention provides for a method for allowing a plurality of communications devices to communicate, the method comprising: receiving a set of incoming audio streams and outputting a plurality of combinations of said incoming streams, each combination being output to a communications device; and for at least one communications device in the set of communications devices: receiving an audio stream; splitting the audio stream into at least a first frequency range stream and a second frequency range stream; and selectively combining the first frequency range stream and second frequency range stream within the combination output to said communications device. In one embodiment the method comprises controlling a volume level of any of said frequency range streams. In one embodiment the method comprises, on the receipt of a signal associated with said communications device, setting the first frequency range stream to a first volume level and setting the second frequency range stream to a second volume level. In one embodiment said signal associated with said communications device is received from said communications device. In one embodiment said signal associated with said communications device is received from a terminal associated with said communications device. In one embodiment the first frequency range stream comprises frequencies in the range of approximately 300 Hz-1500 Hz. In one embodiment the second frequency range stream comprises frequencies above approximately 1500 Hz. In one embodiment the first frequency range stream corresponds to a low frequency range and the second frequency range stream corresponds to a high frequency range stream.

One embodiment of the system and method of the present invention provides for a conference call server for allowing a plurality of communications devices to communicate, the server comprising: a controller capable of receiving a set of incoming audio streams and outputting a plurality of combinations of said incoming streams, each combination being output to a communications device; and wherein the controller capable of: for one communications device in the set of communications devices: receiving an audio stream; splitting said audio stream into at least a first frequency range stream and a second frequency range stream; and selectively combining the first frequency range stream and second frequency range stream within the combination output to said communications device. In one embodiment, said controller is operative to control a volume level of any of said frequency range streams. In one embodiment, the controller is operative, on the receipt of a signal associated with a communications device, to set the first frequency range stream to a first volume level and set the second frequency range stream to a second volume level. In one embodiment, said signal associated with said communications device is received from said communications device. In one embodiment, said signal associated with said communications device is received from a terminal associated with said communications device. In one embodiment, the first frequency range stream comprises frequencies in the range of approximately 300 Hz-1500 Hz. In one embodiment, the second frequency stream range comprises frequencies above approximately 1500 Hz. In one embodiment, the server comprises a plurality of mixers, each mixer associated with a communications device. In one embodiment, the first frequency range stream corresponds to a low frequency range and the second frequency range stream corresponds to a high frequency range stream.

One embodiment of the system and method of the present invention provides for a conference call server allowing a plurality of communications devices to communicate, the server comprising: at least one mixer capable of: accepting incoming audio streams from a set of communications devices, wherein each incoming stream is formatted according to one of a set of formats and each communications device accepts at least one of the set of formats; and for each of a set of communications devices, converting each said incoming stream into a mixable format with comparable audio quality of the output format, mixing at said mixable format, converting back to the format said communications device is capable of accepting, and outputting a combination of said mixed and converted incoming streams to said communications device. In one embodiment, the server comprises a plurality of mixers, each mixer associated with a communications device. In one embodiment, said conversion is a conversion of sampling rates. In one embodiment, said conversion is a conversion of compression methods. In one embodiment, said conversion is a conversion of sampling rate and compression methods. In one embodiment, said mixer is operative to control a volume level of any of said incoming streams.

One embodiment of the system and method of the present invention provides for a method for conducting a conference call among a plurality of communications devices, the method comprising: accepting incoming audio streams from a set of communications devices, wherein each incoming stream is formatted according to one of a set of formats and each communications device accepts at least one of the set of formats; and for a set of communications devices: converting each said incoming stream into a format said communications device is capable of accepting; and outputting a combination of said converted incoming streams to each communications device. In one embodiment, said conversion is a conversion of sampling rates. In one embodiment, said conversion is a conversion of compression methods. In one embodiment, the method comprises controlling a volume level of any of said incoming streams.

One embodiment of the system and method of the present invention provides for a conference call server allowing a plurality of communications devices to communicate, the server comprising: a mixing unit operative to receive a set of incoming audio streams from a set of communications devices and output a plurality of combinations of said incoming streams, each combination being output to a communications device; and a controller operative to determine a status of one of the set of communications devices and to provide to a subset of communications devices an indication of the status, the indication of status being one or both of an audible message or a visual indication. In another embodiment, the status is received from a communications device. In another embodiment, the indication of status includes an identification of a user associated with the communications device. In another embodiment, the indication of status includes an online indication. In another embodiment, the indication of status includes a busy indication. In another embodiment, the controller is operative to periodically determine the status of each communications device. In another embodiment, the indication of status includes the status of the user.

One embodiment of the system and method of the present invention provides for a method for allowing a plurality of communications devices to communicate, the method comprising: receiving a set of incoming audio streams and outputting a plurality of combinations of said incoming streams, each combination being output to a communications device; determining a status of one of the set of communications devices; and providing to a subset of communications devices an indication of the status, the indication of status being one or both of an audible message or a visual indication. In another embodiment, the status is received from a communications device. In another embodiment, the indication of status includes an identification of a user associated with the communications device. In another embodiment, the indication of status includes an online indication. In another embodiment, the indication of status includes a busy indication. In another embodiment, the method comprises periodically determining the status of each communications device. In another embodiment, the method comprises periodically determining the status of each user.

One embodiment of the system and method of the present invention provides for a conference call server allowing a plurality of communications devices to communicate, each communications device associable with a terminal, the server comprising: a mixing unit operative to receive a set of incoming audio streams and output a plurality of combinations of said incoming streams, each combination being output to a communications device; and a controller operative to receive an identification message from a terminal, the identification message associated with an associated communications device, and to associate, at the communications server, the terminal with the communications device In another embodiment, the controller is operative to store the association in a database. In another embodiment, the controller is operative to receive a second identification message from the associated communications device, the second identification message associated with the first identification message. In another embodiment, the identification message is the telephone number of the communications device. In another embodiment, the controller is operative to transmit an identification indication associated with the identification message to a communications device. In another embodiment, the identification indication is an audio user identification. In another embodiment, the terminal is a personal computer. In another embodiment, the terminal and communications device are geographically co-located and physically distinct.

One embodiment of the system and method of the present invention provides for a conference call server allowing a plurality of communications devices to communicate, each communications device associable with a terminal, the server comprising: a mixing unit operative to receive a set of incoming audio streams and output a plurality of combinations of said incoming streams, each combination being output to a communications device; and a controller operative to receive an identification message from a communications device, the identification message associated with a terminal, and to associate, at the communications server, the terminal with the communications device. In another embodiment, the controller is operative to store the association in a database. In another embodiment, the controller is operative to transmit an identification indication associated with the identification message to a terminal. In another embodiment, the identification message is an identification code of the communications device. In another embodiment, the terminal is a personal computer. In another embodiment, the terminal and communications device are geographically co-located and physically distinct.

One embodiment of the system and method of the present invention provides for a method for allowing a plurality of communications devices to communicate, each communications device associable with a terminal, the method comprising receiving a set of incoming audio streams and outputting a plurality of combinations of said incoming streams, each combination being output to a communications device; receiving an identification message from a terminal, the identification message associated with a communications device; and associating the terminal with the communications device. In another embodiment, the method comprises storing the association in a database. In another embodiment, the method comprises receiving a second identification message from the associated communications device, the second identification message associated with the first identification message. In another embodiment, the identification message is the telephone number of the communications device. In another embodiment, the method comprises transmitting an identification indication associated with the identification message to a communications device. In another embodiment, the identification indication is an audio user identification. In another embodiment, the terminal is a personal computer. In another embodiment, the terminal and communications device are geographically co-located and physically distinct.

One embodiment of the system and method of the present invention provides for a method for allowing a plurality of communications devices to communicate, each communications device associable with a terminal, the method comprising: receiving a set of incoming audio streams and outputting a plurality of combinations of said incoming streams, each combination being output to a communications device; receiving an identification message from a communications device, the identification message associated with a terminal; and associating the terminal with the communications device. In one embodiment, the method comprises storing the association in a database. In one embodiment, the method comprises transmitting an identification indication associated with the identification message to a terminal. In one embodiment, the identification message is an identification code of the communications device. In one embodiment, the terminal is a personal computer. In one embodiment, the terminal and communications device are geographically co-located and physically distinct.

One embodiment of the system and method of the present invention provides for a conference call server allowing a plurality of communications devices to communicate, the server comprising: a mixing unit operative to receive a set of incoming audio streams and output a plurality of combinations of said incoming streams, each combination being output to a communications device; and a controller operative to, for one communications device, add an auxiliary audio stream to the combination for the communications device, the auxiliary audio stream being at a first volume level when the combination of streams output to the communications device is above a threshold level and the auxiliary audio stream being at a second, higher, volume level when the combination of streams output to the communications device is at or below a threshold level or when no combination is output to the communications device. In one embodiment, said auxiliary audio stream is stored at the server. In one embodiment, said auxiliary audio stream includes recorded audio streams received from a communications device. In one embodiment, said auxiliary audio stream includes a continuous stream input received from a location external to the server. In one embodiment, the controller is operative to pause the transmission of the auxiliary audio stream. In one embodiment, the controller is operative to, on the receipt of a signal associated with said communications device, set a volume level of the auxiliary audio stream. In one embodiment, said signal associated with said communications device is received from the communications device. In one embodiment, said signal associated with said communications device is received from a terminal associated with the communications device.

One embodiment of the system and method of the present invention provides for a method for allowing a plurality of communications devices to communicate, the method comprising: receiving a set of incoming audio streams and outputting a plurality of combinations of said incoming streams, each combination being output to a communications device; for at least one communications device, adding an auxiliary audio stream to the combination for the communications device, the auxiliary audio stream being at a first volume level when the combination of streams output to the communications device is above a threshold level and the auxiliary audio stream being at a second, higher, volume level when the combination of streams output to the communications device is at or below a threshold level or when no combination is output to the communications device. In another embodiment, said auxiliary audio stream is stored at a central server. In another embodiment, said auxiliary audio stream includes recorded audio streams received from a communications device. In another embodiment, said auxiliary audio stream includes a continuous stream input received from a location external to the server. In another embodiment, the method comprises pausing the transmission of the auxiliary audio stream. In another embodiment, the method comprises, on the receipt of a signal associated with said communications device, setting a volume level of the auxiliary audio stream. In another embodiment, said signal associated with said communications device is received from the communications device. In another embodiment, said signal associated with said communications device is received from a terminal associated with the communications device.

One embodiment of the system and method of the present invention provides for a conference call server allowing a plurality of communications devices to communicate, the server comprising: a mixing unit operative to receive a set of incoming audio streams and output a plurality of combinations of said incoming streams, each combination being output to a communications device; and a controller operative to automatically reestablish a connection between the server and one of said communications devices upon disconnection of said communications device from said server. In another embodiment, the server comprises a database including a list of communications device identifications, wherein the controller is operative to contact a communications device using an identification from said identifications. In another embodiment, said identifications include telephone numbers. In another embodiment, the telephone numbers are gathered using a caller identification method. In another embodiment, the server comprises a plurality of mixers.

One embodiment of the system and method of the present invention provides for a method for allowing a plurality of communications devices to communicate via a server, the method comprising: receiving a set of incoming audio streams and outputting a plurality of combinations of said incoming streams, each combination being output to a communications device; and upon disconnection of a communications device from said server, automatically reestablishing a connection between said server and said communications device. In another embodiment, the method comprises maintaining a list of communications device identifications, wherein reestablishing is based on an identification from said identifications. In another embodiment, said identifications include telephone numbers. In another embodiment, the telephone numbers are gathered using a caller identification method.

One embodiment of the system and method of the present invention provides for a conference call server allowing a plurality of communications devices to communicate, the server comprising: a mixing unit operative to: receive a set of incoming audio streams and output a plurality of combinations of said incoming streams, each combination being output to a communications device; and retransmit within a combination, at a time later than the receipt of a selected subset of said incoming streams, said selected subset. In another embodiment, the retransmission is to a communications device. In another embodiment, the retransmission is performed on the receipt of a signal associated with a communications device. In another embodiment, said signal associated with a communications device is received from the communications device. In another embodiment, said signal associated with a communications device is received from a terminal associated with the communications device. In another embodiment, the retransmission is to a communications device and wherein the subset of said incoming streams includes an input received from the communications device. In another embodiment, said retransmission occurs at a different speed than the speed of the original outputting of the subset of said incoming streams. In another embodiment, said retransmission occurs concurrently with a currently output combination. In another embodiment, said retransmission occurs at a different volume than a currently output combination. In another embodiment, said retransmission occurs at a different volume than the volume of the original output of the subset of said incoming streams. In another embodiment, the server comprises a plurality of mixers.

One embodiment of the system and method of the present invention provides for a method for allowing a plurality of communications devices to communicate, the method comprising: receiving a set of incoming audio streams and outputting a plurality of combinations of said incoming streams, each combination being output to a communications device; and retransmitting within a combination at a time later than the receipt of a selected subset of said incoming streams, said selected subset. In another embodiment, the retransmitting is to a communications device. In another embodiment, the retransmitting is to a communications device and wherein the subset of said incoming streams includes an input received from the communications device. In another embodiment, the method comprises retransmitting on the receipt of a signal associated with a communications device. In another embodiment, said signal associated with a communications device is received from the communications device. In another embodiment, said signal associated with a communications device is received from a terminal associated with the communications device. In another embodiment, the method comprises retransmitting at a different speed than the speed of the original outputting of the subset of said incoming streams. In another embodiment, the method comprises retransmitting concurrently with a currently output combination. In another embodiment, the method comprises retransmitting at a different volume than a currently output combination. In another embodiment, said retransmission occurs at a different volume than the volume of the original output of the subset of said incoming streams.

One embodiment of the system and method of the present invention provides for a conference call server allowing a plurality of communications devices to communicate, the server comprising: a mixing unit operative to receive a set of incoming audio streams and output a plurality of combinations of said incoming streams, each combination being output to a communications device; and a controller operative to receive an indication, and, in response to the indication, cause the set of streams received from a set of communications devices to not be output as part of combinations to at least one of the set of communications devices. In another embodiment, said indication is received from one of the set of communications devices. In another embodiment, said indication is received from a terminal associated with one of the set of communications devices. In another embodiment, said controller is operative, in response to the indication, to cause the set of streams received from the set of communications devices to not be output as part of combinations to each of the set of communications devices. In another embodiment, said controller is operative, when causing the streams received from the set of communications devices to not be output, to transmit other streams as part of combinations to each of the set of communications devices. In another embodiment, the server comprises a plurality of mixers.

One embodiment of the system and method of the present invention provides for a method for allowing a plurality of communications devices to communicate, the method comprising: receiving a set of incoming audio streams and outputting a plurality of combinations of said incoming streams, each combination being output to a communications device; receiving an indication, and, in response to the indication, causing the set of streams received from a set of communications devices to not be output as part of combinations to at least one of that set of communications devices. In another embodiment, said indication is received from one of the set of communications devices. In another embodiment, said indication is received from a terminal associated with one of the set of communications devices. In another embodiment, the method comprises, in response to the indication, causing the set of streams received from the set of communications devices to not be output as part of combinations to each of the set of communications devices. In another embodiment, the method comprises, when causing the streams received from the set of communications devices to not be output, transmitting other streams as part of combinations to each of the set of communications devices.

One embodiment of the system and method of the present invention provides for a conference call server allowing a plurality of communications devices to communicate, the server comprising: a mixing unit operative to receive a first set of incoming audio streams and output a plurality of combinations of said first set of incoming streams, each combination being output to a communications device; a controller operative to receive a second set of incoming audio streams from certain of a subset of communications devices and output a plurality of combinations of said first set of incoming streams and said second set of incoming streams, each combination being output to a communications device in the subset of the communications devices, said second set of incoming streams not being output in combinations to communications devices not in the subset of communications devices. In another embodiment, said controller is operative to transmit the combinations including the second set of incoming streams on receipt of a signal from one of the subset of communications devices. In another embodiment, said controller is operative to transmit the combinations including the second set of incoming streams on receipt of a signal from a terminal associated with one of the subset of communications devices. In another embodiment, within the combinations sent to the subset of communications devices, the first set of incoming streams is at a different volume from the second set of incoming streams. In another embodiment, the server comprises multiple mixers.

One embodiment of the system and method of the present invention provides for a method for allowing a plurality of communications devices to communicate, the method comprising: receiving a first set of incoming audio streams and outputting a plurality of combinations of said first set of incoming streams, each combination being output to a communications device for each of a set of communications devices, receiving a first set of incoming audio streams from a set of communications devices and outputting a combination of said incoming streams said communications device; receiving a second set of incoming audio streams from certain of a subset of communications devices and outputting a plurality of combinations of said first set of incoming streams and said second set of incoming streams, each combination being output to a communications device in the subset of the communications devices, said second set of incoming streams not being output in combinations to communications devices not in the subset of communications devices for each of a subset of communications devices, receiving a second set of incoming streams from certain of the subset of communications devices and outputting a combination of said first set of incoming streams and second set of incoming streams to said communications device, said second set of incoming streams not being output to communications devices not in the subset of communications devices. In another embodiment, the method comprises transmitting the combinations including the second set of incoming streams on receipt of a signal from one of the subset of communications devices. In another embodiment, the method comprises transmitting the combinations including the second set of incoming streams on receipt of a signal from a terminal associated with one of the subset of communications devices. In another embodiment, within the combinations sent to the subset of communications devices, the output of a combination of the first set of incoming streams to the subset of communications devices is at a different volume from the output of the second set of incoming streams.

One embodiment of the system and method of the present invention provides for a method for allowing a plurality of communications devices to communicate, the method comprising: storing a set of user identifications; connecting a set of communications devices via a conference call; and when a communications device is joined to the conference call, attempting to identify the user associated with the communications device and, if the user is associated with a user identification, transmitting the user identification. In another embodiment, the method comprises transmitting the user identification to the set of communications devices. In another embodiment, the user identification is an audio stream. In another embodiment, the user identification is a text message. In another embodiment, the method comprises converting the text message to an audio stream. In another embodiment, attempting to identify comprises matching a telephone number associated with the communications device to a record for a user. In another embodiment, attempting to identify comprises receiving a set of tones from the communications device and matching the set of tones to a record for a user.

One embodiment of the system and method of the present invention provides for a conference call server allowing a plurality of communications devices to communicate, the server comprising: a database storing a set of user identifications; a controller capable of: connecting a set of communications devices via a conference call, and, when a communications device is joined to the conference call, attempting to identify the user associated with the communications device and, if the user is associated with a user identification, transmitting the user identification. In another embodiment, the user identification is transmitted to the set of communications devices. In another embodiment, the user identification is an audio stream. In another embodiment, the user identification is a text message. In another embodiment, the controller is capable of converting the text message to an audio stream. In another embodiment, the controller is capable of matching a telephone number associated with the communications device to a record for a user. In another embodiment, the controller is capable of receiving a set of tones from the communications device and matching the set of tones to a record for a user. In another embodiment, the server comprises a plurality of mixers.

One embodiment of the system and method of the present invention provides for a conference call server allowing a plurality of communications devices to communicate, the server comprising: a mixing unit operative to receive a set of incoming audio streams and output a plurality of combinations of said set of incoming streams, each combination being output to a communications device; and a controller operative to: accept a third party audio stream from a third party communications device and add said third party audio stream as part of each combination; and transmit a subset of said incoming streams to said third party communications device, and prevent transmission of incoming streams not in the subset to said third party communications device. In another embodiment, the server is part of a telecommunications system. In another embodiment, the server comprises a plurality of mixers. In another embodiment, the third party stream is a telephone conversation.

One embodiment of the system and method of the present invention provides for a method for allowing a plurality of communications devices to communicate, the method comprising: receiving a set of incoming audio streams and outputting a plurality of combinations of said set of incoming streams, each combination being output to a communications device; accepting a third party audio stream from a third party communications device; adding said third party audio stream to each of the combinations; and transmitting a subset of said incoming streams to said third party communications device while preventing transmission of incoming streams not in the subset to said third party communications device. In another embodiment, the method comprises transmitting to communications devices via a telecommunications system. In another embodiment, the third party stream is a telephone conversation.

One embodiment of the system and method of the present invention provides for a server for transmitting a telephone call, the server comprising: a controller capable of: accepting a first microphone signal from a first microphone sensitive to a near field; accepting a second microphone signal from a second microphone sensitive to a far field, the first and second microphones being located at a first communications device; accepting from a user an indication of near and far field mix; and outputting at a second communications device a mix including a portion of the first microphone signal and a portion of the second microphone signal, the mix of the first microphone signal and the second microphone signal being according to the user indication. In another embodiment, the controller is located at a site remote from the first and second communications devices. In another embodiment, the controller is located at the second communications device. In another embodiment, the controller is capable of conducting a conference call including the first and second communications devices. In another embodiment, said indication is received from one of the communications devices. In another embodiment, said indication is received from a terminal associated with one of the communications devices.

One embodiment of the system and method of the present invention provides for a method of transmitting a telephone call, the method comprising: accepting a first microphone signal from a first microphone sensitive to a near field; accepting a second microphone signal from a second microphone sensitive to a far field, the first and second microphones being located at a first communications device; accepting from a user an indication of near and far field mix; and outputting at a second communications device a mix including a portion of the first microphone signal and a portion of the second microphone signal, the mix of the first microphone signal and the second microphone signal being according to the user indication. In another embodiment, the method comprises, at a site remote from the first and second communications devices, creating the mix. In another embodiment, the method comprises, at the second communications device, creating the mix. In another embodiment, the method comprises, at a site remote from the first and second communications devices, conducting a conference call including the first and second communications devices. In another embodiment, said indication is received from one of the communications devices. In another embodiment, said indication is received from a terminal associated with one of the communications devices. In another embodiment, the method comprises conducting a conference call among at least the communications devices.

One embodiment of the system and method of the present invention provides for a server for allowing a plurality of communications devices to communicate, the server comprising: a controller capable of: receiving a set of incoming audio streams and outputting a plurality of combinations of said set of incoming streams, each combination being output to a communications device; the controller capable of, for at least one combination: dividing the combination into a plurality of channels; accepting a user indication; and according to the user indication, proportioning the audio streams within the combination among the channels. In another embodiment, each combination includes two channels. In another embodiment, the user indication includes a set of proportions. In another embodiment, the proportioning includes outputting a proportion of each audio stream within the combination to each of the channels. In another embodiment, said user indication is received from one of the communications devices. In another embodiment, said user indication is received from a terminal associated with one of the communications devices.

One embodiment of the system and method of the present invention provides for a method for allowing a plurality of communications devices to communicate, the method comprising: receiving a set of incoming audio streams and outputting a plurality of combinations of said set of incoming streams, each combination being output to a communications device; and for at least one combination: dividing the combination into a plurality of channels; accepting a user indication; and according to the user indication, proportioning the audio streams within the combination among the channels. In another embodiment, each combination includes two channels. In another embodiment, the user indication includes a set of proportions. In another embodiment, the proportioning includes outputting a proportion of each audio stream within the combination to each of the channels. In another embodiment, said user indication is received from one of the communications devices. In another embodiment, said user indication is received from a terminal associated with one of the communications devices.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
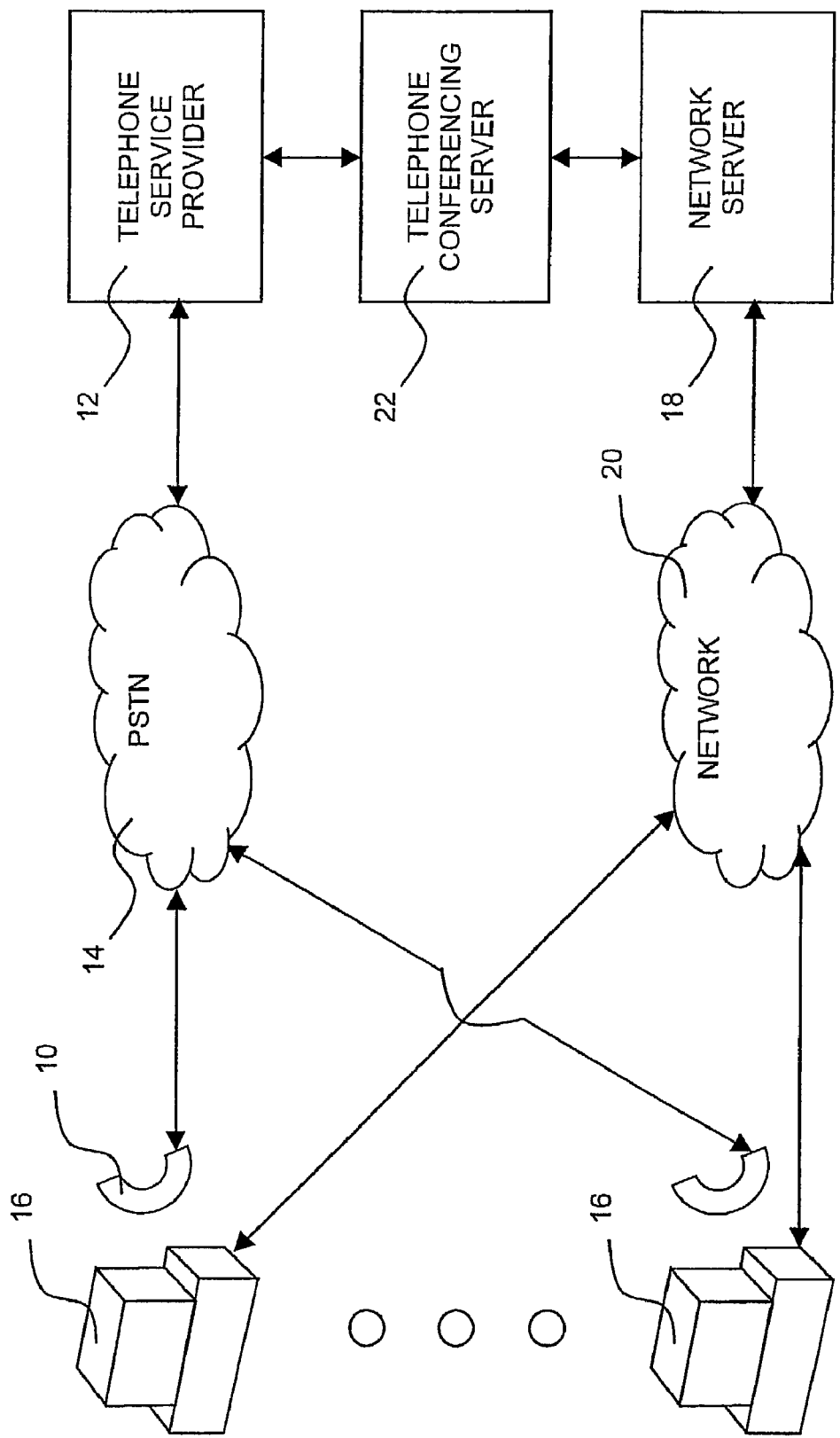
FIG. 1 is a simplified illustration of a participant-controlled conference calling system, constructed and operative in accordance with a preferred embodiment of the present invention.

Reference is now made to FIG. 1, which is a simplified illustration of a participant-controlled conference calling system, constructed and operative in accordance with a preferred embodiment of the present invention. In the system of FIG. 1 a number of conference participants, represented as communicators 10, are shown connected to a Telephone Conferencing Server 22 via a telephone service provider interface 12 and via a Public Switched Telephone Network (PSTN) 14. Telephone Conferencing Server 22 may be a stand-alone unit or may be part of, for example, a telephone exchange, a PBX, an intra-organizational telephone system, or other equipment. The functionality of Telephone Conferencing Server 22 may be spread over different modules, possibly geographically separate.

Communicators 10 provide audio streams from conference call participants via PSTN 14 that are received by the telephone service provider at telephone service provider interface 12, which may be any standard telephone service provider interface 12, and transferred to the Telephone Conferencing Server 22. Communicators 10 may be any commercially available audio communications devices, such as, but not limited to, telephones, cellular telephones, PCs or other devices with audio telephony capability and microphones, and a communicator 10 may include equipment such as a handset, a touch-tone keypad, a speaker, a controller, etc. Each participant also preferably has a terminal or computer 16 that is connectable via a public data network 20, such as the Internet, via the Public Data Network Service Provider Interface 18 to a Telephone Conferencing Server 22. Computer 16 typically includes a user interface, such as a graphical user interface (GUI), a text entry interface, such as, but not limited to, a keyboard, a touch screen and/or a handwriting recognition device, and a pointing device, such as, but not limited to, a mouse or a pen and touch screen, that a conference participant may use to provide control messages from conference call participants via, for example, network 20 or another system, that are received by the public data network service provider at public data network service provider interface 18. Computer 16 or a communicator 10 may communicate with server 22 to provide control messages on behalf of users. Typically, each pair of a computer 16 and communicator 10 are geographically co-located (e.g., in the same room) and are physically distinct devices (e.g., a telephone and a personal computer). However, the computer 16 and communicator 10 may be the same device, such as in the case of a PC with telephony capability. Not all communicators 10 need be paired with a computer 16.

Communications from participants received via telephone service provider interface 12 and public data network service provider interface 18 are forwarded to a conferencing server 22 where they are processed as described in greater detail herein below.

Communicator 10 may be any known microphonic or telephonic equipment. If digital, communicator 10 preferably has a high sampling rate and a wide audio bandwidth, such as a sampling rate of 16,000 samples per second resulting in an audio bandwidth of 300-7400 Hz using conventional coding technologies, or a CD-quality sampling rate of 40,000 samples per second with 16-bit linear coding resulting in an audio bandwidth of 20-18,000 Hz with 16 bits of dynamic range (or $2^{16}$) being the ratio between the smallest representable signal amplitude and the highest representable signal amplitude. Other bandwidths and sampling rates may be used. Where heterogeneous communicators 10 are used the system typically translates all incoming audio qualities and coding formats to one common format and sampling rate using conventional signal processing algorithms for sample rate conversion and scaling. The common format may be different per communicator and may be determined by the communicator preferred format. While in one embodiment a format may be defined by variations in sampling rates, other formats may be used, such as compression methods or ratios, or methods of reading or storing audio data.

In one embodiment, where different communicators 10 have different audio formats, the audio formats received by server 22 need not be initially standardized by server 22. For each communicator 10, the received audio streams (whether from communicators 10 or from other sources) may be converted, typically before mixing to a mixable format (typically linear encoding such as PCM-Pulse Code Modulation, but the invention is not limited to such formats) with effectively similar or higher audio quality than the communicator audio format, then mixed and then converted to the format acceptable by that communicator 10. Methods of converting audio formats are known. In certain embodiments, one mixer or unit may perform all such conversions for all communicators 10. For example, different communicators 10 may have different sampling rates, and the server 22 may ensure each communicator 10 receives the proper sampling rate format.

A communicator 10 may have more than one microphone, where each microphone is sensitive to a different (possibly overlapping) set of frequency ranges. The signals received from the microphones may be transmitted as separate signals, or alternately may be combined or multiplexed into one signal for easy transmission. The signals may be manipulated by the communicator 10 before transmission, at the server 22 after reception, or at a communicator 10 receiving the signal (or signals); for example, the volume of the signals may be altered relative to each other. Such transmission, combination, or manipulation may be under the control of, for example, a controller device within the communicator 10 or of a user. Controllers for telecommunications devices, such as microprocessors or computers on a chip controlling telephones or PCs with telephony capability, are known.

Figure 2:
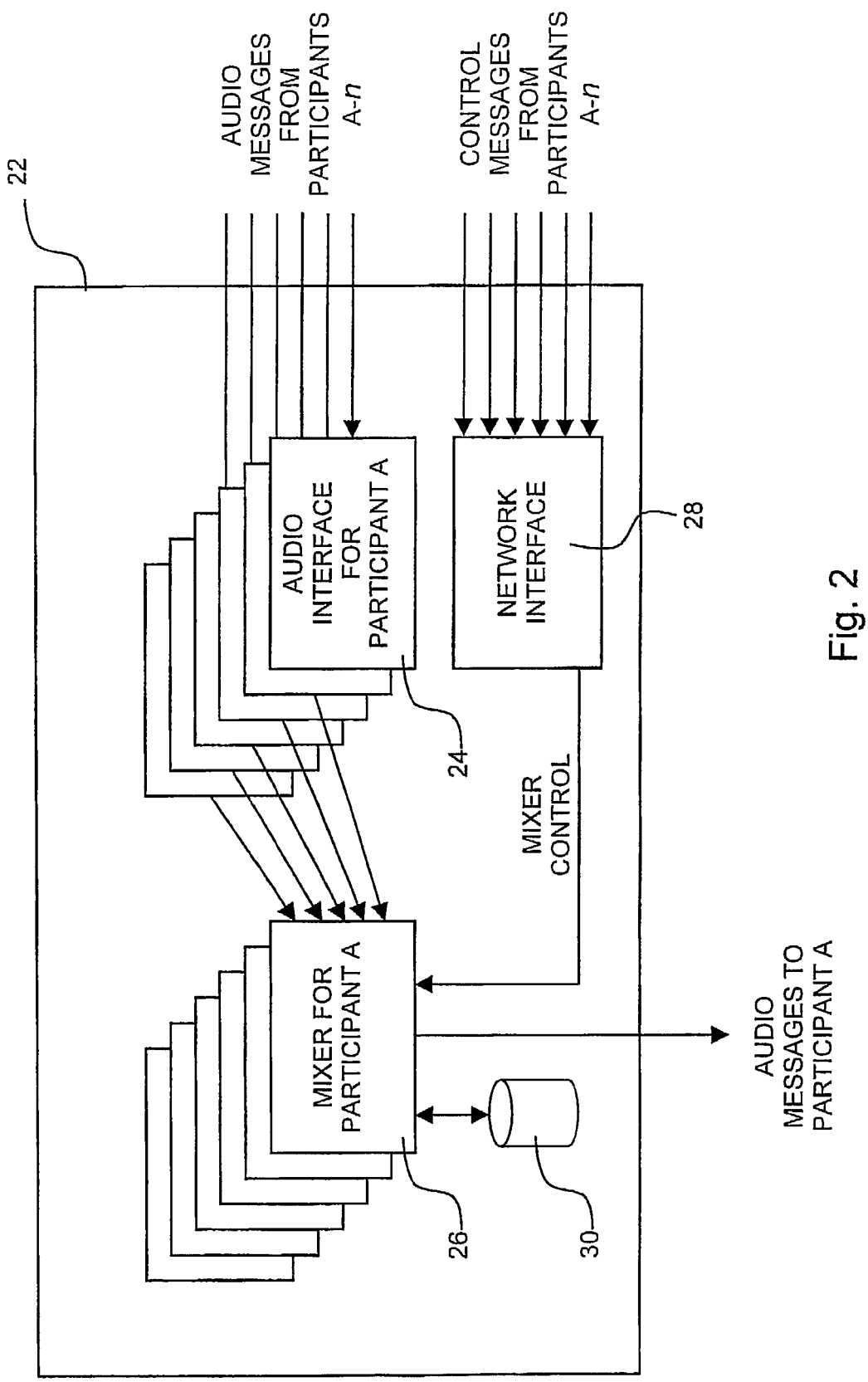
FIG. 2 is a simplified block diagram illustration of Telephone Conferencing Server 22 of FIG. 1, constructed and operative in accordance with a preferred embodiment of the present invention.

Reference is now made to FIG. 2, which is a simplified block diagram illustration of conferencing server 22 of FIG. 1, constructed and operative in accordance with a preferred embodiment of the present invention. Server 22 preferably comprises a plurality of audio interfaces 24, such as a D/160SC-LS, available from Dialogic, Inc., 1515 Route Ten, Parsippany, N.J., 07054, via which audio streams are received from the conference call participants, a plurality of mixers 26, such as a VND128, 128 Port Conferencing Bridge, available from Real Time Systems, Inc., 35640 Fremont Blvd., Suite 101, Fremont, Calif., 94536, to which the interfaces 24 forward the audio streams, and a network interface 28, which may be any standard network interface suitable for receiving control messages from the various participants by which the mixers 26 are controlled. Each audio interface 24 and mixer 26 is preferably adapted such that each communicator 10 provides audio input to one specific audio interface 24 and receives audio output from one specific mixer 26. In alternate embodiments the functionality of the mixers may be combined into one unit or mixer, or may be spread among various units or mixers, and need not be in discrete mixers, each associated with a communications device.

Server 22 may be any suitable computer hardware and software platform capable of supporting audio interface 24, mixer 26, and network interface 28, and controlling same via an appropriate processing architecture (not shown) using conventional techniques.

Each audio interface 24 preferably includes conventional hardware and/or software to support in-band signaling such as DTMF detection and generation as well as out-of-band signaling, echo cancellation, ring detection, and analog, digital, or voice over data network interfaces such as, but not limited to VoIP communications. DTMF may be used by a DTMF-equipped communicator 10 to provide command messages to server 22 via PSTN 14, thus providing a control channel in addition to or as an alternative to that provided by computer 16 via network 20.

Each mixer 26 preferably includes conventional hardware and/or software to support DTMF filtering as well as other in-band signaling if used in the system, as well as volume and mute control (note that muting and volume may be considered related functions, such that a signal to eliminate or fully reduce a volume signal may be equivalent to a mute signal). Each mixer 26 preferably has at least one auxiliary input for mixing prerecorded messages or additional audio sources. These additional audio sources may be, for example, prerecorded or received audio streams, music or messages to be played when a participant is on hold, vocalized information, such as news, stock quotes, system messages, subliminal messages, educational material, etc., preferably selected by the participant with which the mixer is associated. Such sources may be recorded and stored by or under the control of the server 22, or may be continuous inputs accepted by server 22 (e.g., a feed, an Internet stream, a radio broadcast, etc.) which typically cannot be paused by server 22. It is appreciated that such auxiliary audio can be played during an ongoing conference call during an active or quiet period of the ongoing conference, and can be automatically activated and controlled by server 22 and/or be manually activated and controlled by each participant, such as by turning the volume down, by pausing and continuing any of the auxiliary inputs, change its playback speed (changing playback speed includes pausing, e.g., changing the speed to zero and reversing) typically with pitch adjustment or by turning any of the auxiliary inputs off.

Server 22 is preferably capable of storing audio streams directed to it via Audio Interface 24 in, for example, a storage device 30 for later playback. Storage device 30 may be any conventional storage means, such as, but not limited to, audio tape, a hard disk, digital audio tape (DAT), or compact disc, capable of having audio streams stored thereon and retrieved there from, or other audio storage systems.

Each server 22 also preferably includes conventional hardware and/or software to support receiving text messages via network interface 28 and converting text messages into audio messages. Likewise, each server 22 also preferably includes conventional hardware and/or software to support convert audio messages into text messages or commands that may then be provided to conference participants via their computers 16 and/or via their communicators 10 using any conventional means, and/or used to control the mixer.

Figure 3:
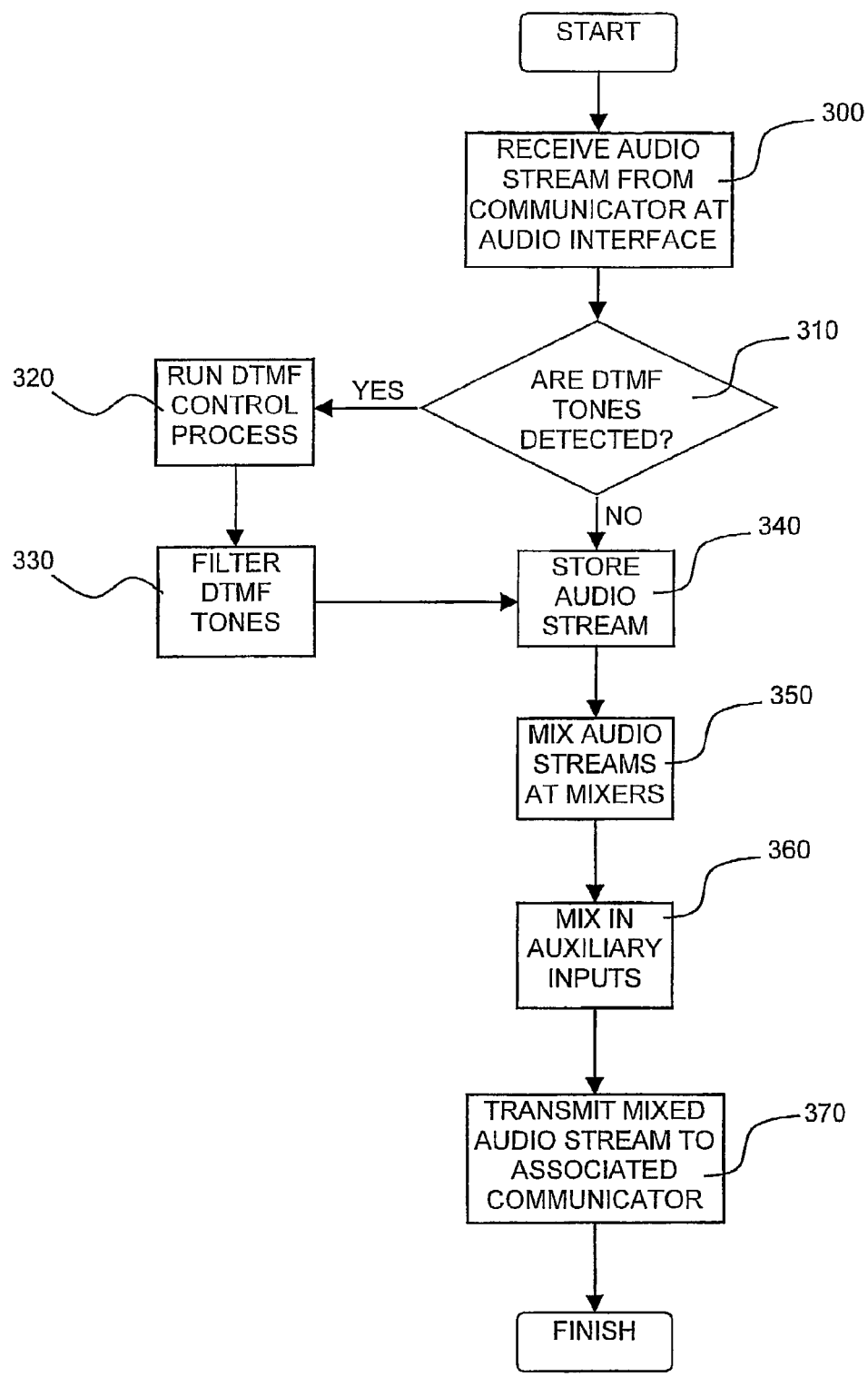
FIG. 3 is a simplified flowchart illustration of a method of operating the system of FIGS. 1 and 2 in accordance with a preferred embodiment of the present invention.

Reference is now made to FIG. 3, which is a simplified flowchart illustration of a method of operating the system of FIGS. 1 and 2 in accordance with a preferred embodiment of the present invention. In the method of FIG. 3 an audio stream from communicator 10 is received by a corresponding one of the audio interfaces 24 (step 300). The received audio stream is preferably analyzed using DTMF detection to check for the presence of DTMF tones or other in-band signaling tones (step 310). If DTMF or other signaling tones are detected, typically caused by a user pressing a key on a telephone that is being used as communicator 10, a control process is invoked to determine whether the DTMF tones represent a control message from the user (step 320). The DTMF tone is then preferably filtered out of the audio stream (step 330). The audio stream is optionally saved into an audio file on storage 30, typically as a cyclic audio file implementing any suitable conventional FIFO storage algorithm (step 340). This process is concurrently applied for all communicators 10 currently participating in a conference call.

The audio streams from any of the audio interfaces 24 are then preferably converted to a common audio format and mixed at mixers 26 (step 350). The selection of which audio streams are to be mixed at a particular mixer is preferably performed in accordance with control messages sent by the computer 16 that is pre-associated with the particular mixer. Likewise, auxiliary inputs, such as prerecorded system messages and the like, may be obtained from storage 30, preferably along with a other corresponding relevant media type messages to fit all communicators and end points, or other sources, such as radio or text-to-speech, and mixed into the mixed audio stream at mixer 26 (step 360). The mixed audio stream is then transmitted to the communicator 10 that is pre-associated with the mixer 26 (step 370), while other corresponding media type messages are sent to matching end points, to effectively create a situation that the same message can be heard by a user using a communicator, and can be seen as text for example by someone using a computer terminal thus effectively achieving cross media messaging.

The system of FIGS. 1 and 2 is preferably configured to periodically determine the current state of each communicator 10 (e.g., each conference participant, with the understanding that a conference participant may have more than one communicator, such as one for each ear). Each conference participant typically indicates his current state by providing to conference server 22 a pre-defined DTMF tone via communicator 10 indicating a specific state and/or by sending a pre-defined control message from computer 16. Examples of current states may include ONLINE, indicating that a conference participant is in conference, BUSY, indicating that a conference participant is unable to talk but can listen, SLEEP, indicating that a conference participant elects not to participate, and STANDBY, indicating that a conference participant is not currently participating, but willing to be ONLINE. The system is preferably configured to indicate to each participant, vocally and/or visually (e.g. by using the display on the computer 16 or on a communications device 10), the status of the other participants. The status may include, for example, an identification for a user associated with the communications device (e.g., an audio or visual indication of the user's name or telephone number).

The system is also preferably configured to periodically determine the line status of each conference participant. Line statuses may include, but are not limited to, CONNECTED, NOT CONNECTED, IDLE or RINGING. Based on both the current status of the conference participant and the line status, a number of actions may be taken. If the conference participant is in the ONLINE state and his line status is NOT CONNECTED, then a connection may reinstated between the conference participant's communicator 10 and conferencing server 22 using conventional techniques, such as dialing out in order to reconnect the conference participant. Otherwise, the conference participant is CONNECTED or RINGING, and thus need not be reconnected. If the conference participant's state is STANDBY and his line status is IDLE, the system will wait for the participant to call into the system, or for the participant's status to change by another participant or by an internal process, such as from STANDBY to ONLINE. If the conference participant's state is STANDBY and his line status is RINGING, conferencing server 22 may answer the call and may ask for the conference participant to provide his identification, typically by a entering a password via computer 16 or a DTMF code via communicator 10.

Conference participant states or status may be changed by the system or externally by other conference participants. For example, if the system maintains a schedule with respect to when to initiate a specific call to a conference participant, at the designated time the system may change the conference participant's state from STANDBY to ONLINE or from any other state to ONLINE, causing the system to establish a connection between the conference participant's communicator 10 and conferencing server 22. Alternately, if a conference participant A is standing by and is not connected, another conference participant B may choose to change the status of conference participant A to ONLINE, causing a connection to be established to conference participant A.

Figure 4:
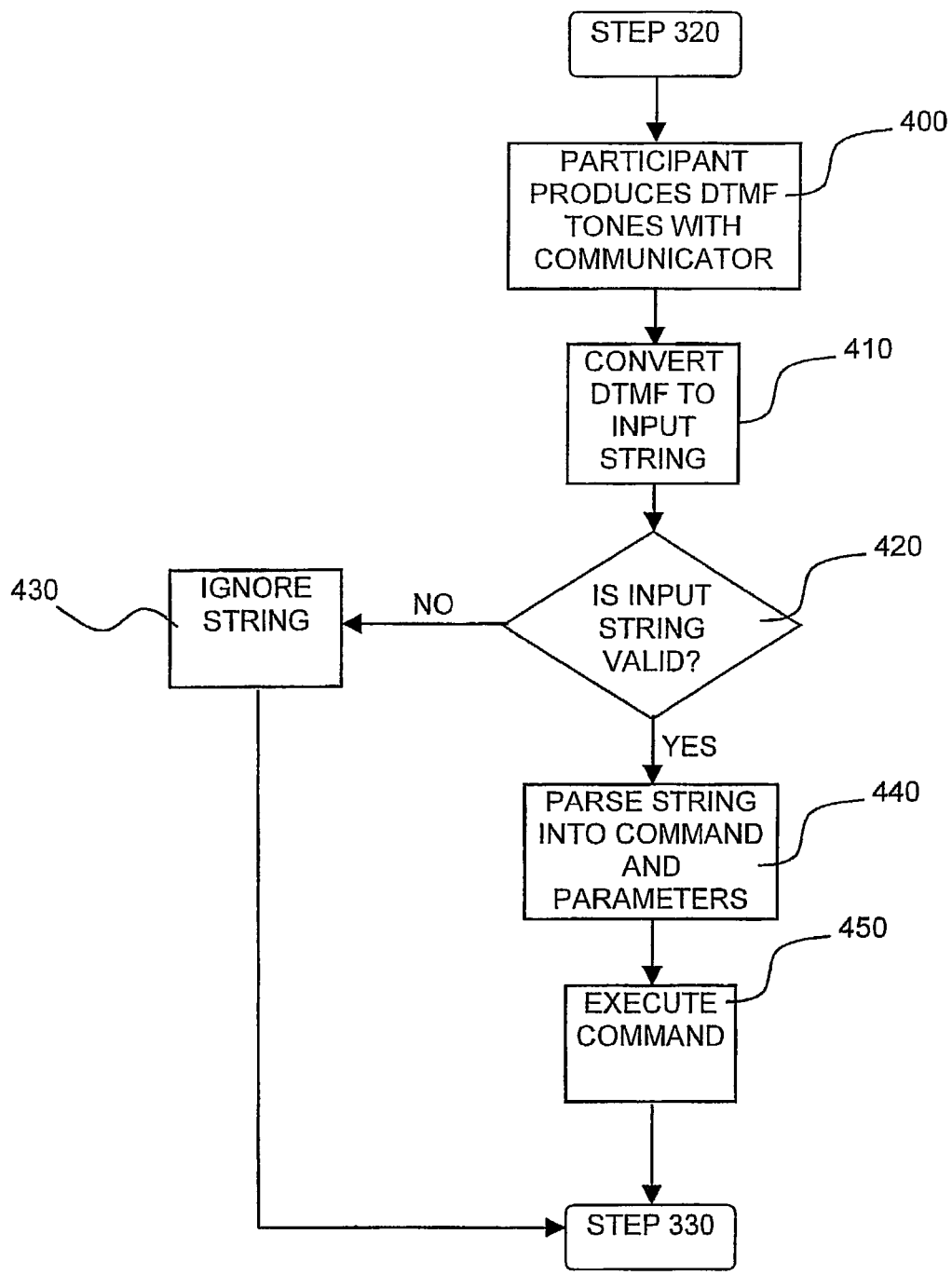
FIG. 4 is a simplified flowchart illustration of a method of implementing step 320 of FIG. 3 in accordance with a preferred embodiment of the present invention.

Reference is now made to FIG. 4, which is a simplified flowchart illustration of a method of implementing step 320 of FIG. 3 in accordance with a preferred embodiment of the present invention. In the method of FIG. 4 a conference participant presses a key on communicator 10, as described above, to produce a DTMF tone or series of tones (step 400). The DTMF is received by conferencing server 22 and converted to the actual symbols of the correspondingly pressed keys to form an input string (step 410). The input string is then compared to predefined valid strings maintained by conferencing server 22 to determine whether it is known or valid (step 420). If the string is unknown, invalid, or its input is not completed in a reasonable time (typically a few seconds) it is ignored (step 430).

If the string is valid, it is preferably parsed into specific command and parameters in accordance with a predefined parsing algorithm (step 440). The commands are then executed using any relevant parameters (step 450). Preferably, commands may have multiple parameters, including parameters for identifying the communicator from which the command originated, for identifying a specific audio stream, the volume at which to set a specific audio source as it is mixed at mixer 26, or a master volume for all output from mixer 26. Some commands may contain as few as a single parameter identifying the conference participant that generated the DTMF tone.

Figure 5:
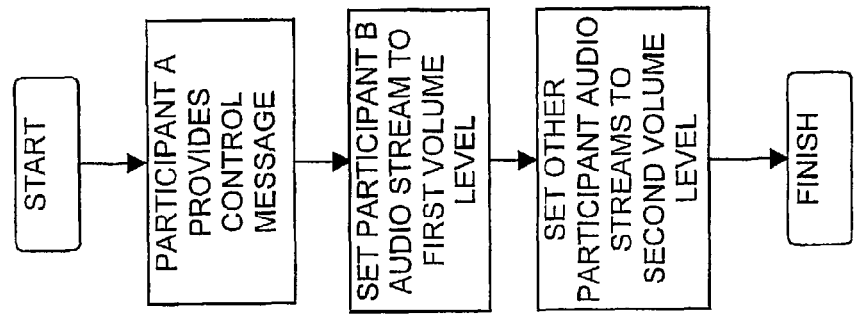

Reference is now made to FIG. 5, which is a simplified flowchart illustration of a method of controlling mixer 26, operative in accordance with a preferred embodiment of the present invention. In the method of FIG. 5 a conference participant A provides a control message to conferencing server 22 indicating that the input volume of the audio stream of a conference participant B to the mixer 26 associated with user A, should be set to a first volume level, while all other incoming audio streams, to that mixer, should be set to a second volume level.

Figure 6:
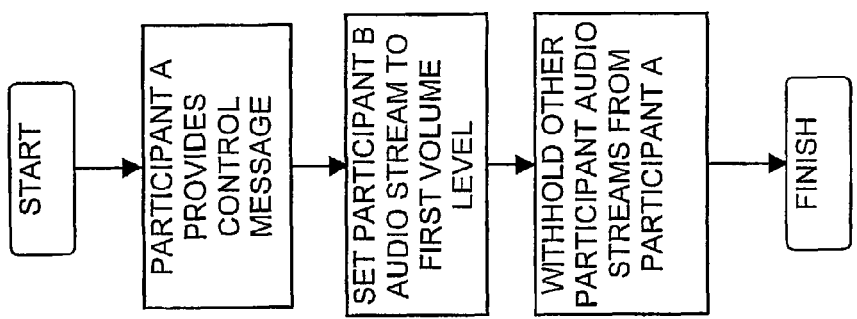

Reference is now made to FIG. 6, which is a simplified flowchart illustration of a method of controlling mixer 26, operative in accordance with a preferred embodiment of the present invention. In the method of FIG. 6 a conference participant A provides a control message to conferencing server 22 indicating that the input volume of the audio stream coming from a conference participant B to the mixer 26 associated with user A, should be set to a first volume level, and that all other audio streams should not be sent to conference participant A.

Figure 7:
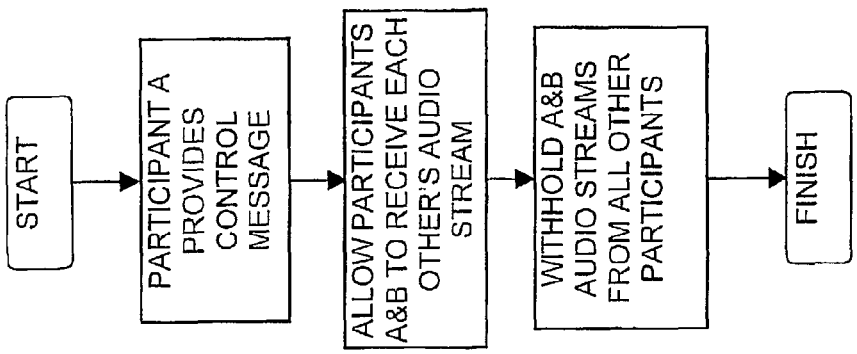
FIGS. 5-15 are a simplified flowchart illustrations of various methods of controlling mixer 26, operative in accordance with preferred embodiments of the present invention.

Reference is now made to FIG. 7, which is a simplified flowchart illustration of a method of controlling mixer 26, operative in accordance with a preferred embodiment of the present invention. In the method of FIG. 7 a conference participant A provides a control message to conferencing server 22 indicating that the input audio streams of conference participant A and of a conference participant B should not be mixed in at the mixers of any other conference participants other than at the mixers of conference participant A and B. Thus, A and B may have a private discussion without having to disconnect from the conference.

Figure 8:
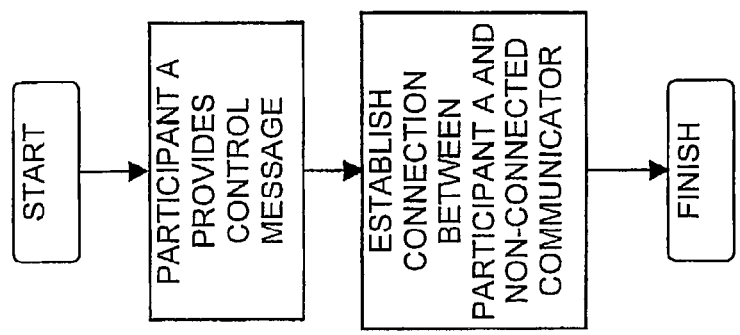

Reference is now made to FIG. 8, which is a simplified flowchart illustration of a method of controlling mixer 26, operative in accordance with a preferred embodiment of the present invention. In the method of FIG. 8 a conference participant A provides a control message to conferencing server 22 indicating that a connection should be established between conference participant A and another communicator 10 not currently connected to conferencing server 22. Thus, any conference participant may add new conference participants during an ongoing conference.

Figure 9:
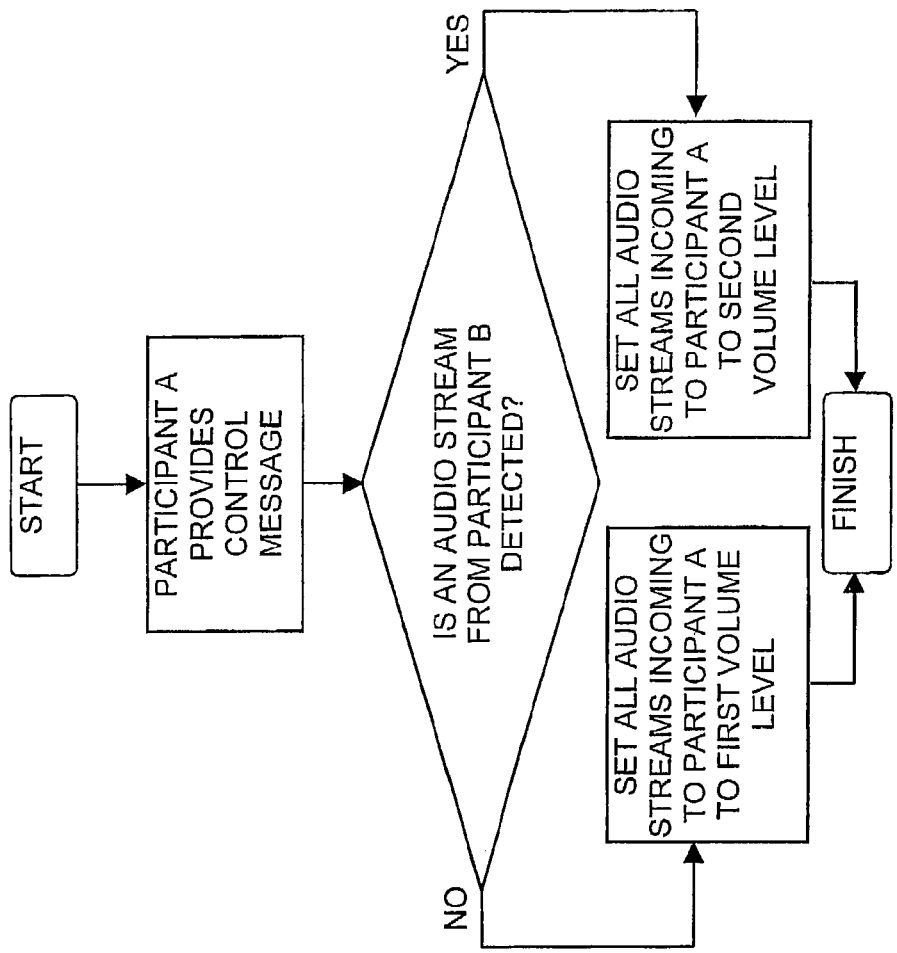

Reference is now made to FIG. 9, which is a simplified flowchart illustration of a method of controlling mixer 26, operative in accordance with a preferred embodiment of the present invention. In the method of FIG. 9 a conference participant A provides a control message to conferencing server 22 indicating that, until a different command is provided, audio streams sent by all conference participants to conference participant A be set to a first volume level in the absence of an audio stream from a conference participant B, and set to a second volume level in the presence of an audio stream from conference participant B to conference participant A. Thus, all audio may be played at a high volume until a conference participant B provides an audio stream, at which point the volume of all audio streams provided to the mixer of conference participant A is lowered to allow conference participant A to hear conference participant B at a higher volume.

Figure 10:
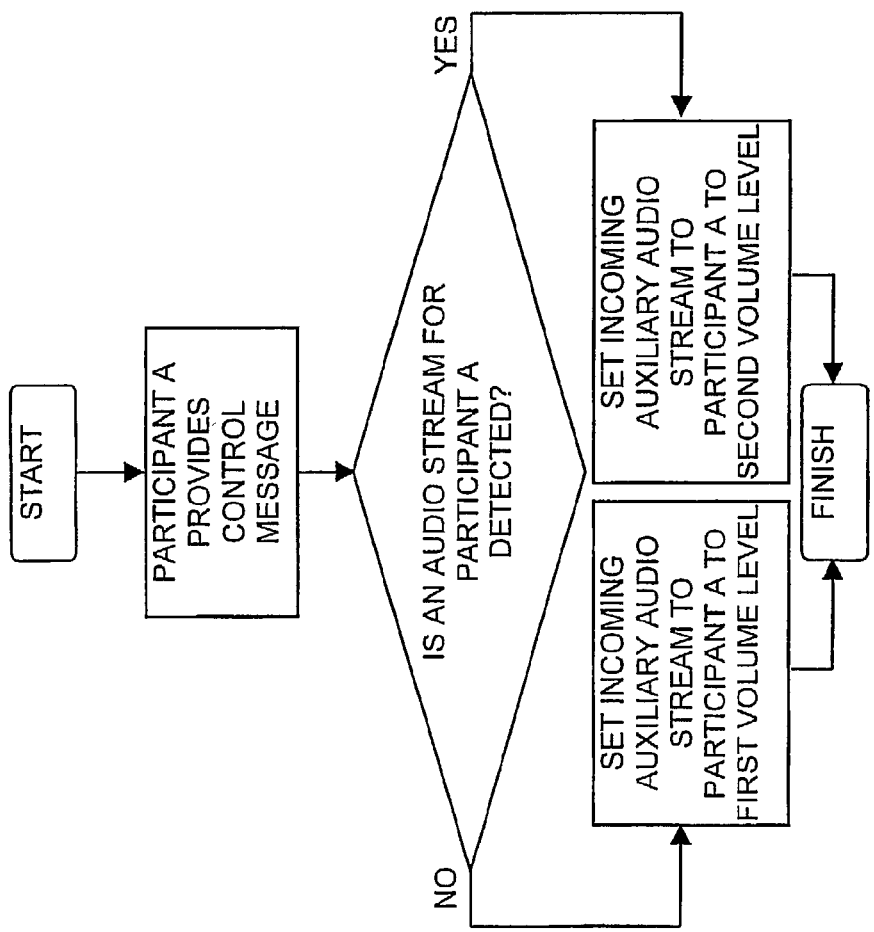

Reference is now made to FIG. 10, which is a simplified flowchart illustration of a method of controlling mixer 26, operative in accordance with a preferred embodiment of the present invention. In the method of FIG. 10 a conference participant A provides a control message to conferencing server 22 indicating that, until a different command is provided, audio streams sent by an auxiliary audio source to conference participant A be set to a first volume level in the absence of an audio stream from all other conference participants received by A's mixer, or when the combination of audio streams received is at or below a certain level, where that level may be zero, and set to a second volume level in the presence of an audio stream from at least one other conference participant received by A's mixer. Thus, participant A can listen to auxiliary audio at different volume levels during quiet periods versus non-quiet periods. The server may also pause the auxiliary audio source when not heard by the participant or when a participant so requests. The mixer may be implemented in two stages—a main stage on the server and a final stage on the communicator for mixing pre-loaded content form a fixed or detachable memory on the communicator. When the server uses such two-stage mixing, the local mixer will interpret the user command and control the relative volume of the content and the audio stream provided from the first mixing stage on the server so that the content may be played or paused during quiet or non-quiet periods as explained above. It is important to note that in the present embodiment all mixers reside on the server. It is possible to locate mixers at any location in the network as well as on the end points or communicators. It is also important to note that mixers can be implemented in a plurality of stages so that each stage mixes its input streams according to its control messages and sends the mixed input to another stage to be mixed with additional streams. The distribution of mixers may enable a system designer the flexibility to trade CPU power or scalability with network bandwidth required to carry additional information between the distributed mixers.

The auxiliary audio stream may be, for example, a pre-recorded audio stream or may be a continuous stream input which is received from a location external to the server (e.g., a radio station or an external audio feed not recorded at the server).

Figure 11:
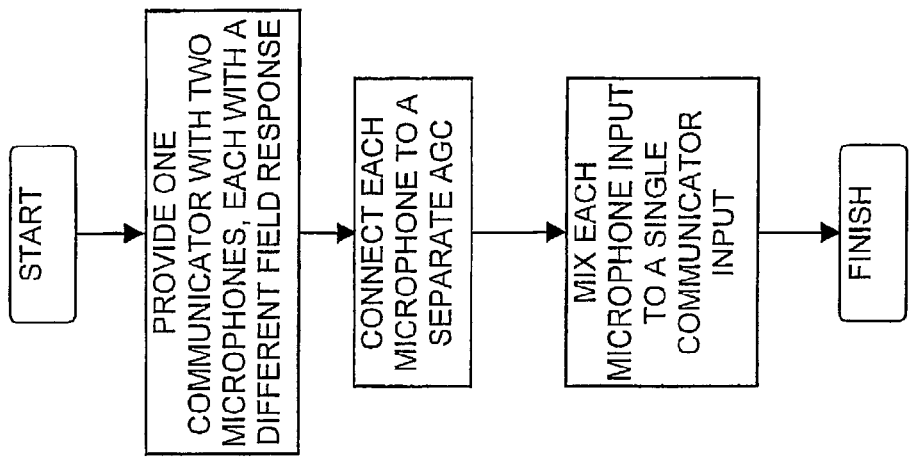

Reference is now made to FIG. 11, which is a simplified flowchart illustration of a method of connecting multiple microphones to a single communicator, where the microphones have different field responses. In the method of FIG. 11 one microphone is responsive to far audio field, and another microphone is responsive to near audio field. One or more of the microphones is preferably connected to a separate Automatic Gain Control (AGC) arrangement incorporated into the input circuitry of the communicator. Inputs from both microphones are added via a single mixer to communicator 10's microphone input. Such an arrangement may provide better audio sensitivity for a far-away speaker where a nearby speaker talks in a loud voice, and, conversely, may reduce interference from background noise when a nearby speaker speaks softly. A block diagram of an implementation of the method of FIG. 11 may be seen with additional reference to FIG. 11B.

Figure 12:
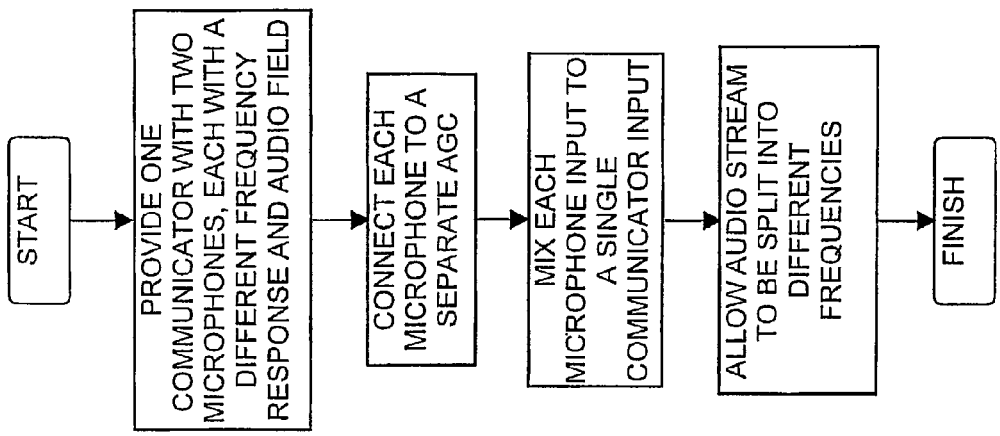

Reference is now made to FIG. 12, which is a simplified flowchart illustration of a method of controlling mixer 26, operative in accordance with a preferred embodiment of the present invention. In the method of FIG. 12 a conference participant A provides a control message to conferencing server 22 indicating that an incoming audio stream should be split into a two or more frequency ranges, and that the volume of each frequency range may be independently controlled. Such an arrangement allows multiple microphones to be used with a single communicator 10, where each microphone is set to receive a specific frequency range and a different audio field (e.g., far away or close by). In an alternate embodiment, such functionality may be effected with audio streams received from a communicator with one microphone. In such a case, the server 22 (or a mixer 26 at the server 22) may split an incoming audio stream into a low frequency range stream and high frequency range stream. More than two ranges or microphones may be used. This arrangement will enable, for example, a participant A to select if only participant B is to be heard by participant A (e.g., in a low frequency range, for example 300 Hz-1500 Hz), or if participant B is to be heard by participant A together with background noise from participant B's surrounding environment (e.g., including a higher frequency range, for example 1500 Hz-3400 Hz) by adding second frequency range. Similarly, only the background noise may be selected to be received by participant A. A block diagram of an implementation of the method of FIG. 12 may be seen with additional reference to FIG. 12B. Other ranges may be used, more than two ranges may be used, and the ranges may overlap. While in one embodiment, the ranges are contiguous (e.g., 300 Hz-1500 Hz and 1500 Hz-3400 Hz), in another embodiment, each range may be segmented and the different ranges may be interlaced and mostly non-overlapping (e.g., First Range segments may be 350 Hz -500 Hz, 800 Hz -1100 Hz, 1400 Hz-2000 Hz, 2300 Hz-3000 Hz And second range, 500 Hz-800 Hz, 1100 Hz-1400 Hz, 1800 Hz-2300 Hz, 2900 Hz-3400 Hz.) Segments may be in different sizes and may have different ranges.

It is appreciated that the methods of FIGS. 11 and 12 may be combined by connecting multiple microphones with different field responses and different frequency responses to a separate per-microphone Automatic Gain Control (AGC) incorporated into the input circuitry of the communicator. A block diagram of an implementation of the combined methods of FIGS. 11 and 12 may be seen with additional reference to FIG. 12C.

In an embodiment with multiple microphones, for certain communicators 10, multiple audio streams are received at the server 22. On receipt of a command from a user the user's communicator 10 receives only the audio stream from the low range microphone, only the audio stream from the high range microphone, or both, at different volume levels (one volume level may be zero). For example, a "Cut Noise" button on a user's communicator 10 or terminal 16 may cause the audio stream from one or more communicators' high range microphones to be sent to the relevant user at reduced volume (reduced volume including no volume). In an embodiment where one microphone is used, the audio streams received at the server 22 may be split into low and high frequency ranges (or more ranges, wherein the ranges may overlap), and similar functionality may be achieved. The streams may be split into more than two ranges; for example a low range, middle range, and high range. The ranges may overlap, and may be filtered. The ranges may be, for example, the frequency ranges associated with the microphones discussed herein.

Figure 13:
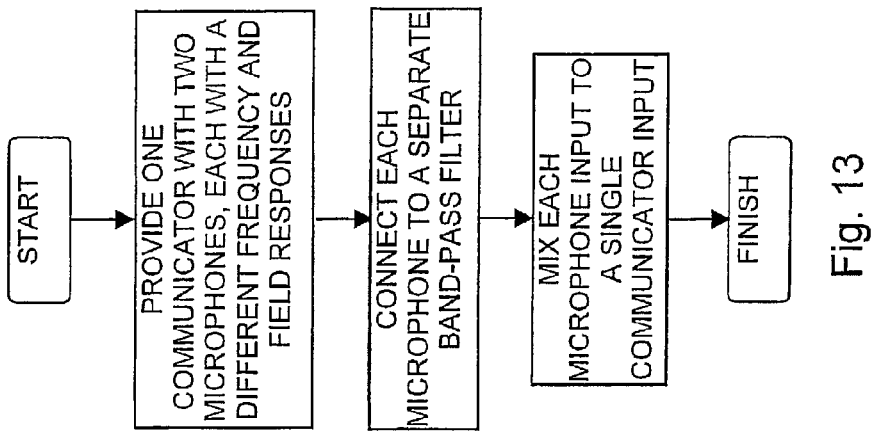

Reference is now made to FIG. 13, which is a simplified flowchart illustration of a method of connecting multiple microphones to a single communicator, where the microphones have different field responses and different frequency responses. In the method of FIG. 13 one microphone is responsive to far audio field, and another microphone is responsive to near audio field. Each microphone is preferably connected to a separate band-pass filter, and both are added via a single mixer to communicator 10's microphone input. Such an arrangement provides better audio sensitivity for a far-away speaker where a nearby speaker talks in a loud voice, and also allows the listener to shift its attention from the speaker itself to the sounds in the speaker's surroundings.

Figure 14:
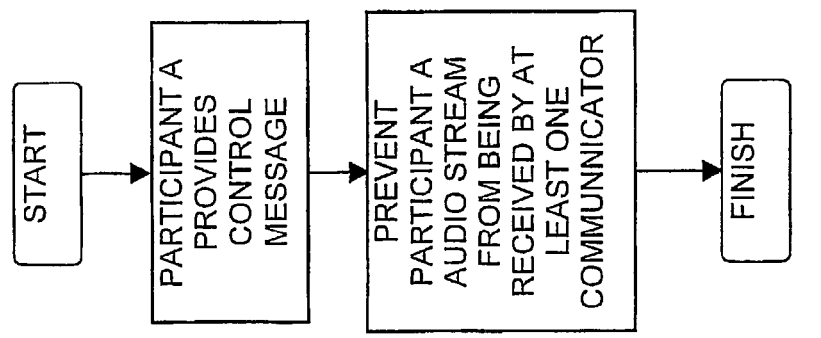

Reference is now made to FIG. 14, which is a simplified flowchart illustration of a method of controlling mixer 26, operative in accordance with a preferred embodiment of the present invention. In the method of FIG. 14 a conference participant A provides a control message to conferencing server 22 indicating that an outgoing audio stream from conference participant A should be prevented from being received by at least one other of said communicators. Thus, a whisper mode or a full-mute mode may be provided to a subset of the users. When used herein, a set or a subset may include one member, a subset of a set may include all members of the set, and two sets of the same objects may or may not include the same objects.

Figure 15:
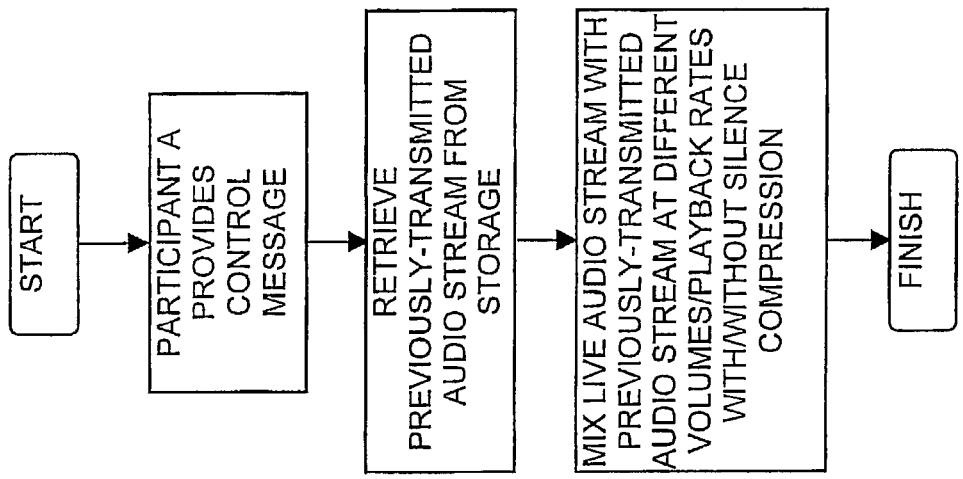

Reference is now made to FIG. 15, which is a simplified flowchart illustration of a method of controlling mixer 26, operative in accordance with a preferred embodiment of the present invention. In the method of FIG. 15 a conference participant A provides a control message to conferencing server 22 indicating that one or more audio streams previously-transmitted to conference participant A be retrieved from storage 30 and retransmitted to conference participant A. The retransmission may be done at a higher volume level (preferably user-defined per channel) that other currently-incoming audio streams, or all other audio streams may simply be muted. The last m minutes, hours, etc. of the audio stream to be retransmitted may also be specified. The storage used is preferably cyclic FIFO storage so that during delayed playback it may continuously fill with "live" information, enabling a participant to stay on a delayed listening mode indefinitely. Silence compression techniques and audio compression techniques are also preferably employed to reduce storage consumption, thus enabling a participant who listens to a delayed playback to skip silence periods and reduce time gaps between the delayed playback and the "live" conference. Skipping live periods can be performed only if all input-delayed playback channels are simultaneously silent. Additionally or alternatively, the gap between the delayed playback and the live audio stream may be closed by speeding up the playback and, for example, employing known signal processing methods of adjusting the pitch (e.g., the base frequency of the speech) of the speeded up playback to its original frequency band.

Storage device 30 (FIG. 2) may be used to record any aspect of the activity of the system of FIGS. 1 and 2 as expressed by any of the methods described hereinabove. This activity information may be analyzed at any time to report a participant's activity and participation, and may be used in the development of incentive plans based on a participant's contribution to team work. For example, the amount of time a specific participant was muted by others relative to other team members may be measured and used to reduce the participant's incentive.

Referring again to FIGS. 1 and 2, when a call is initiated by communicator 10 the server 22 accepts controls for a specific mixer using DTMF tone generated by the user pressing keys on the communicator. When computer 16 is activated, the server associates communicator 10 and computer 16 with the same user. To accomplish this, the user may send a command (e.g., DTMF) to the server via the communicator instructing the server to send an audio or vocalized user ID, such as an ID number, to the user via the communicator 10 that is to be entered via keypad by the user on the input device of computer 16. Alternatively, the user may press a key on the terminal that generates a string of DTMF tones to the terminal speaker, where the DTMF tones represent a command and a session ID. When the tones are picked up by the communicator microphone they indicate to the server 22 that this session ID is related to a specific communicator now located near the terminal. The latter method may also be performed manually, with the command and Session ID being displayed on the terminal, prompting the user to press the corresponding keys on the communicator, thus sending DTMF tones to the server indicating to the server that the communicator should be associated with the terminal now controlling the specific session ID.

Other methods may be used; for example, the user may transmit the telephone number or other (e.g., arbitrary) identifier of the communicator 10 via the computer 16, or may transmit the same user ID using both the communicator 10 and computer 16. For example, the same ID or code may be sent using a communicator 10 keypad (or spoken into the communicator 10 receiver) and the computer 16 keyboard.

In general, any conference participant may control the level or mute status of any volume stream which is relevant to that conference participant and which is output by the communicator 10 associated with that conference participant and/or by any other conference participant communicator 10. Such control need not be only of volume streams output from that conference participant, but may also be of volume streams output to that conference participant.

For example, a conference participant may control the level or mute status of volume streams which are output by the communicator 10 associated with that conference participant and sent by a second conference participant. A conference participant may control the level or mute status of volume streams which are produced by that conference participant, or which are meant to be received by that conference participant alone (e.g., "whisper" mode). Such control may be via, for example, an associated communicator 10 or computer 16. For example, a user may use a communicator 10 to send DTMF signals to the Server 22 requesting that audio streams sent from the communicator 10 be muted at all other conference participants, or be muted at all but a certain set of other conference participants. As a further example, a user may use a computer 16 associated with the user's communicator 10 to send commands to the server 22 requesting that audio streams sent between the communicator 10 and a set of other communicators 10 be muted at all other conference participants. Such user-controlled functionality may be used to effect the various functionalities discussed herein (e.g., "whisper" mode, etc.).

In one embodiment of the system and method of the present invention, a conference call participant may initiate, receive or otherwise participate in a telephone call to/from a third party not participating in the conference call. At the same time, the participant can hear the conference call, but the other conference call participants cannot hear the conversation between the participant and the third party, and (optionally) the third party cannot hear the conference call. Such a mode, or other similar or related modes, may be termed "semi-detached" modes, because one (or more) users semi-detach from a conference call. The communications device 10 of the semi-detached participant may receive the conference call at a first volume level, and participates in a telecommunications session with third party communications device at a second volume level. Either the first or the second volume level may be identical to the volume level at which the participant received the conference call before semi-detaching, and may be identical to the volume level at which the conference call was initially output. For example user A, participating in a conference call via server 22, may place or receive a telephone call to/from a third party X. For example, a third party X may transmit a telecommunications session request (e.g., a telephone call, or another signal, etc.) to a conference call server or to a conference call participant. User A and third party X engage in a normal telephone conversation, at normal volume. The other conference call participants cannot hear this conversation (e.g., cannot hear either user A or third party X). User A can hear the conference call, possibly at a reduced volume, but third party X cannot.

In a further embodiment, a third party added to the conference call may be able to hear the "adding" party, and the third party's audio output may be sent to all conference call participants, but the third party may not be allowed to hear the conference call participants (except for the adding party). For example, member A of the conference call may add an "expert" to the conference call (or receive the expert's call). Member A, being the point of contact with the expert, may, for example, ask the expert questions, which the other participants may hear, along with the answers provided by the expert. The expert typically only receives an audio stream from member A. Alternately, a subset (subset including sets of one) of conference call participants may transmit audio streams to the expert.

In one embodiment, the server 22 may, during a conference call, accept an input or request from a third party communicator 10 which is not participating in the conference call. The input or request may be, for example, a received telephone call directed to, for example, the server 22 (e.g., directed to a telephone number associated with the server 22). Alternately, the input or request may be directed to another device, such as a particular communicator 10 participating in the conference call. The input or request may include, for example, a code or other identifier identifying one or more target communicators 10 participating in the conference call.

In response, the server 22 may allow the third party communicator to participate in a telecommunications session (e.g., a telephone call, etc.) with the target communicator(s) 10. The telecommunications session may be conducted, for example, as the "semi-detach" type session is communicated, or, for example, a session, as discussed above, where a third party added to the conference call may be able to hear the "adding" party, and all conference call participants may hear the third party. In one mode, from the point of view of the third party, it is a normal telephone call, and from the point of view of the receiving conference call participant, it is a normal telephone call, but with the ongoing conference call in the background.

Assigning an incoming input or request from a third party communicator 10 to a particular conference call participant may be performed, for example, based on a telephone number dialed used to reach the server 12 or conference call participant, which for example may be a toll-free number terminated by the system 12 and associated and unique to a specific conference call participant. Alternately, an IVR may be used, and the user or the third party communicator 10 may be asked for a code or pin number associated with the receiving conference call participant. Further, voice recognition may be used; e.g., the receiving conference call participant's name may be recognized.

The system 12 may provide an indication or announcement to the receiving conference call participant, for example via a communicator 10 or a computer 16. For example, the system 12 may provide an audible message such as "Incoming call from (Name or Phone), please press # (for example) to accept."

In one embodiment, a GUI may be presented on a terminal or computer 16 associated with one or more user's communications devices 10 (e.g., a PC at the same site as the communications device 10, from which a user may control the conference call conducted via the communications device 10). The GUI may be displayed at the command of, or may be displayed under the partial control of, or based on information or signals sent from, the server 12. For example, the server 12, in communication with the computer 16, may send mix level or mix data information to the computer 16 which is displayed in the GUI and the GUI may accept control information or mix data (e.g., a user alters the GUI using, for example, a keyboard or pointing device) to be sent to the server 12. Under the direction or in response to signals from the server 12, the output of the GUI may be caused to be altered—for example, data on mix levels may be sent, and the display of mix levels may be altered. Alternately, the computer 16 may alter the GUI based on internal data and based on user commands, without receiving signals from the server 12.

Figure 16:
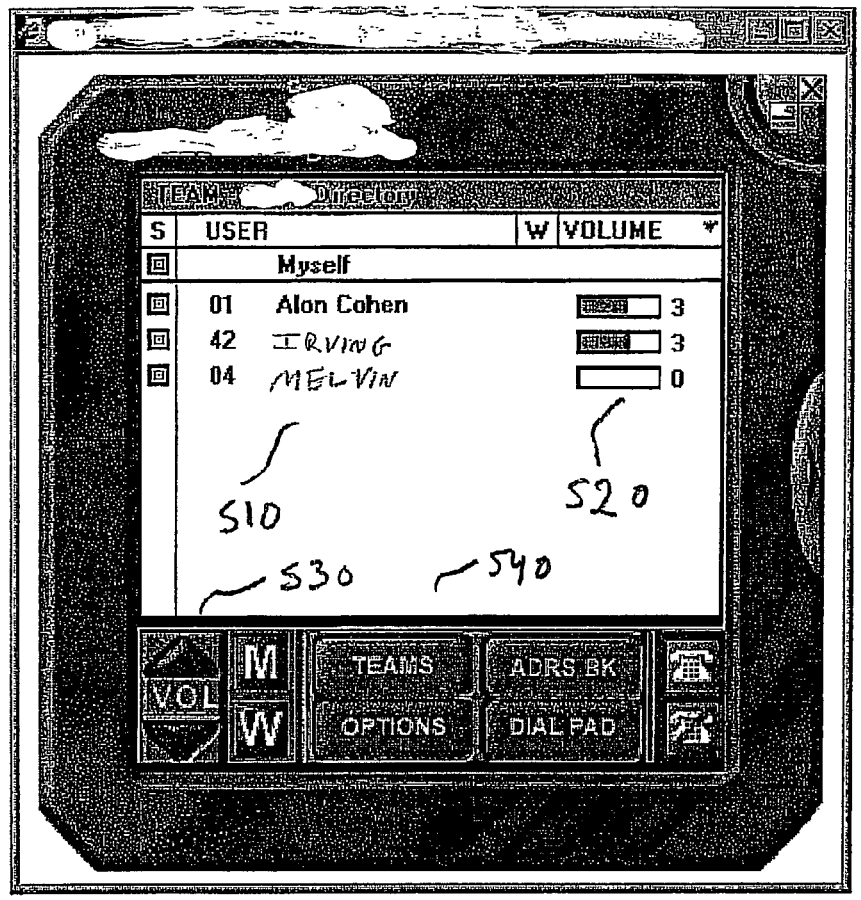
FIG. 16 is a diagram of a screen display in accordance with one embodiment of the present invention.

FIG. 16 is a diagram of a screen display in accordance with one embodiment of the present invention. Referring to FIG. 16, GUI 500 may be displayed on, for example, a monitor connected to a computer 16. The GUI 500 may be created by the computer 16, but may be partially under the control of, or may respond to data sent by, the server 12. The GUI 500 may display, for a user, a set of conference call participants 510, each associated with a volume level 520. Controls 540 may provide functionality such as, for example, the selection or alteration of teams, dialing telephone numbers, communication with the server 12, etc.

A user may use a control such as a mouse or keyboard to alter a volume level 520 associated with a user Such change may be performed by, for example, selecting a participant 510 and manipulating a volume control 530; other GUI methods may be used. In response, a signal is sent to the server 12, and the server 12 alters the mix level sent to the communicator 10 associated with the GUI 500, as discussed elsewhere herein. The server 12 or computer 16 causes the GUI 500 to display the new mix level. In the example shown, user 1 is heard by user "Myself" at level 3, user 42 is heard at level 3, and user 4 is heard at level 0. User "Myself" can set the mixing to different levels in order to, for example, better "focus" on one or more specific conference call participants.

In alternate embodiments, GUIs of other forms may be used, and the GUI may be used for other purposes or functionality.

In one embodiment, a user may be able to control what inputs are sent to each of two or more channels which are output on the communications device 10 associated with the user. In a typical embodiment, two channels are used (e.g., a right and a left), but in alternate embodiments other numbers of channels may be used.

One application of such a feature may be to split inputs into different groups or inputs, each group or input output with different volume levels to each of two speakers, or split between the speakers so that one set of inputs is output to one speaker and another to the other speaker. If a user separates the inputs into to two groups, each group heard in a different manner by a different ear, the user may choose to focus on one or the other set of outputs, and switch attention very rapidly between the two sets and/or have a much better perceived spatial separation between outputs. The user may, for example, switch between two simultaneous conversations input to his communications device 10, or may more easily track who is saying what in the case of voice streams that sound similar. In such an embodiment, the relevant communications device typically includes more than one speaker, suitably spatially separated. For example, stereo speakers or headphones may be used.

Existing prior art discusses the issue of spatially separating users to different virtual location by separating a single source of audio to the two ears in different phases and amplitude, so that the brain interprets that as if the person is speaking from a distinct physical location relative to other participants. The system and method discussed herein is simpler, and yet allows each listener to create a unique separation and to have individual control in a simple manner.

In one embodiment, server 12 may operate a conference call, and may send to each communications device 10 a plurality of channels (e.g., a left and a right, although other numbers of channels may be used). The output to the communications devices 10 may be according to known methods, or to the methods described elsewhere herein. The server 12 may, for each communications device 10, divide the combination of streams sent to that device into a set of channels. The proportion of each audio stream sent to each channel may be set according to a user indication (although a default or a pre-defined setting may be used). The user may thus direct the server 12 to alter and re-proportion the mix across the channels. The user indication may, for example, include a set of proportions (e.g., set the input from "Bob" to right only, and the mix from "Ted" to the left only, and the mix from "Carol" to be equally output from right and left). Further, in addition to a relative mix, an absolute volume may be indicated. In one embodiment, the indication may be in the form of an absolute volume level for each stream for each channel.

In an alternate embodiment, the functionality of proportioning the mix may be elsewhere than a central server; for example, at a communications device 10 or at a computer 16.

Figure 17A:
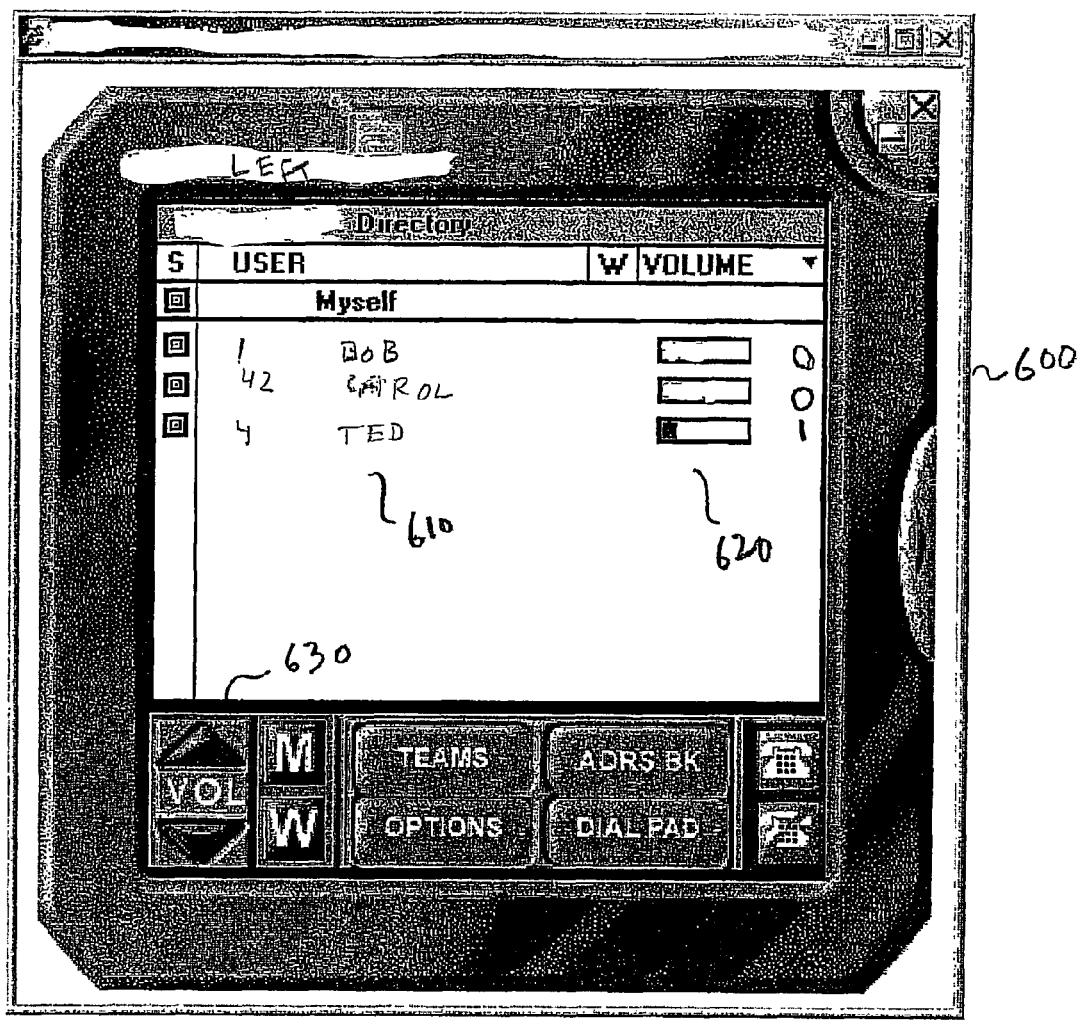
FIGS. 17a and 17b are diagrams of portions of screen displays in accordance with one embodiment of the present invention.
Figure 17B:
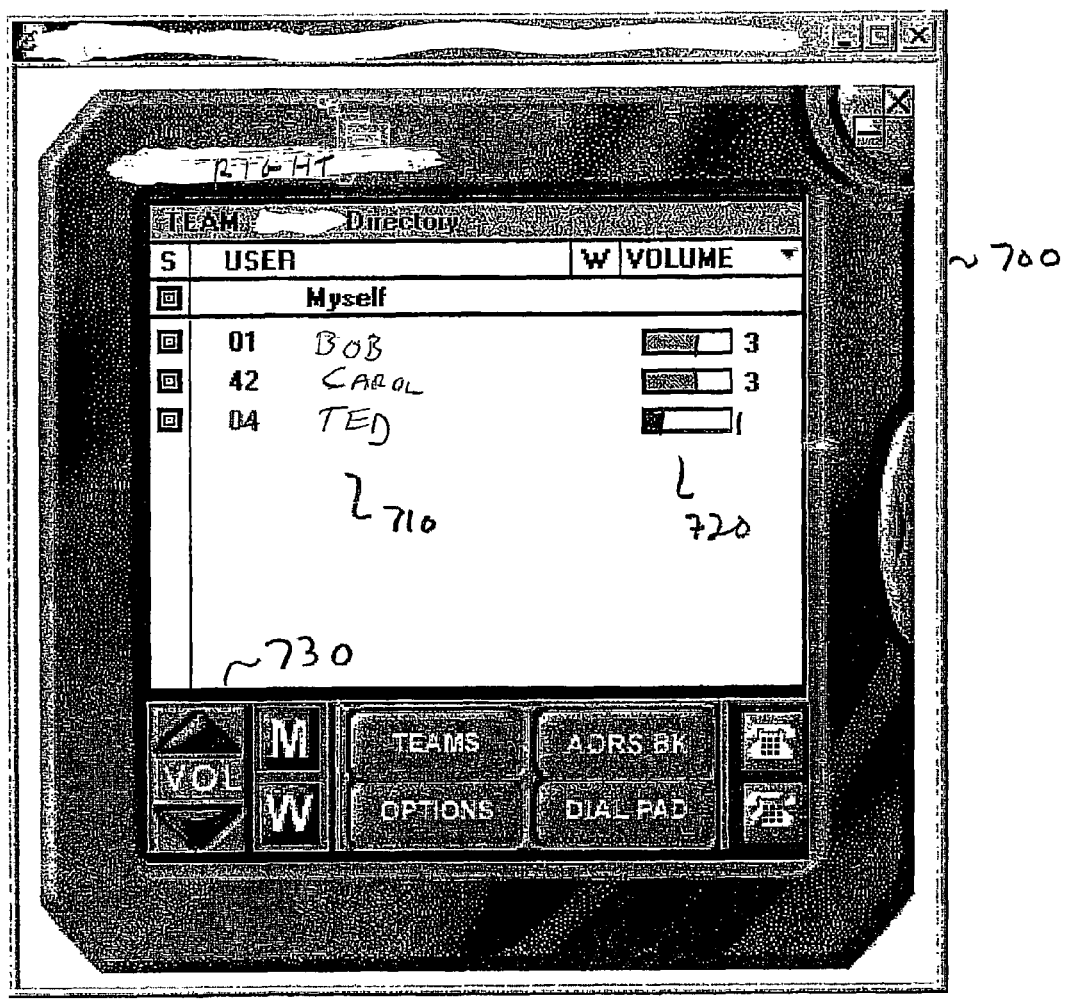

FIGS. 17a and 17b are diagrams of portions of screen displays in accordance with one embodiment of the present invention. Referring to FIGS. 17a and 17b, GUI sections 600 and 700 may be displayed on, for example, a monitor connected to a computer 16, as discussed elsewhere. The GUI sections 600 and 700 may be created by the computer 16, but may be partially under the control of, or may respond to data sent by, the server 12. The GUI sections 600 and 700 may display, for a particular channel output to a communications device 10, a set of conference call participants 610 and 710, each associated with a volume level 620 and 720. In the embodiment shown, the GUI sections 600 and 700 are displayed together (e.g., side by side) on a computer monitor, but may be displayed in a different manner. GUI section 600 allows a user to control the left channel output to a communications device 10 and GUI section 700 allows a user to control the right channel output to a communications device 10.

A user may use a control such as a mouse or keyboard to alter a volume level 620 or 720 associated with a user, for example using volume controls 630 and 730 (other GUI methods may be used to effect user control and feedback). In response, a signal is sent to the server 12, and the server 12 alters the mix level sent to the channel and communicator 10 associated with the GUI section 600 or 700, as discussed elsewhere herein. The server 12 or computer 16 causes the appropriate GUI section 600 or 700 to display the new mix level. In the example shown, user 1 ("Bob") is heard by user "Myself" at level 0 in the left channel and 3 in the right channel (i.e., all in the right), user 42 ("Carol") is heard by user "Myself" at level 0 in the left channel and 3 in the right channel, and user 4 ("Ted") is heard by user "Myself" at level 1 in the left channel and 1 in the right channel (i.e., at a low volume, centered). User "Myself" can set the mixing to different levels in order to, for example, have one participant or group be received from one speaker and another one participant or group be received from another speaker.

In alternate embodiments, GUIs of other forms may be used, and the GUI may be used for other purposes or functionality.

The above described functionality may be achieved easily using the system and method described herein, where a conference call participant has some control over audio streams sent to other participants which are relevant to the conference call participant, either directly or by activating certain functionality in the server which effects such functionality. For example, if a participant activates the above described "semi-detach" functionality via, for example, a DTMF tone or other indication at the participants' communicator 10 or computer 16, the following adjustments might be made, possibly by altering the audio streams mixed at the appropriate mixers 26: The relevant participant and the third party may receive each other's audio streams as in a normal telephone conversation. The relevant participant may receive all audio streams output from the conference call participants, possibly at a volume level that is less than the volume level of the conversation with the third party. In one embodiment, the third party cannot hear the conference call participants, the conference call participants cannot hear the third party, and the conference call participants cannot hear the semi-detached participant.

In one embodiment, as discussed above, each communicator 10 may include near/far sensitive microphones. Such microphones may be comparatively sensitive to a near/far field by, for example frequency differentiation.

Alternately, other known "near field" and "far field" differentiation systems and methods may be used. For example, a "close-talking" or noise canceling microphone may be used, such as those using pressure gradient techniques. One such known microphone is a directional microphone with a field sensitivity in the shape of, for example, a figure "8", and may be termed a cosine or bi-directional microphone. Such a single microphone, may function as a near field (e.g., "close talking") microphone and effectively cancel (or reduce) far field ambient noise. A unidirectional microphone directed away from the user can be used as a far field microphone to pick up ambient noise or other speakers in the vicinity of the user. Thus such a combination of microphones may be used as first and a second microphone, producing a first and a second microphone signals.

Two audio sources, from two different microphones, may also be used to create two signal sources, one generally capturing far field signals and one generally capturing the near field. Such signals if multiplexed at the communicator or sent as two separate signals to the server are generally separable and may be controlled by the listener. The user may decide if he wants to listen to, for example, a person speaking (typically by listening to the near field microphone input) or to people and sounds in the surroundings (typically by listening to the far field microphone), or to any combination of the above. Such functionality may be provided by allowing the user to alter the mix of signals received at a communicator 10, as discussed elsewhere.

During a conference call, the server 22 may accept both near and far channels from some or all communicators 10, via near and far microphones, each outputting a signal. The server 22 may accept indications from users, either via a communicator 10 or a computer 16, regarding the mix to be output at a communicator 10. For example, the user may click on a "cancel background noise" button on a communicator 10 display, which transmits the signal to the server 22. In response, the server may alter the mix of near and far channels for the communicator 10 associated with the user, lowering the output of the far channel. Other alterations in the near/far mix of a first communicator 10 (or a group of communicators 10, as a set) output to a second communicator 10 may be accomplished, in other manners.

In further embodiments, the accepting of the signal and the altering of the mix may be performed at a communicator 10; for example, at the communicator 10 associated with the user issuing the command. In further embodiments, the alteration of a near/far mix may be performed outside the context of a conference call, for example in the context of two communicators 10 participating in a normal two (or three, four, etc.) telephone call.

In a further embodiment of the system and method of the present invention, users may pre-register with the server 22 as conference call participants. For example, a user account may be maintained for each participant, or alternately, for a team leader or other central contact point, at the server 22. The user account may be in, for example, a database, but may be maintained in other manners. A database at the server 22 may store other information, such as text or audio messages for users, recorded audio streams (e.g., previous audio streams received from communicators 10, music, etc), or other information. If a user account is assigned to one focal point, the user account may include, for example, a list of participants' identifiers, and, for each participant, the user's name in text and/or audio form, and may include other information. Alternately a user account may contain only information on the user, and possibly information such as which conference call group(s) or team(s) the user belongs to. Users or participants' identifiers may be, for example, telephone numbers (e.g., the telephone number of a communicator 10), URLs, Uniform Resource Identifiers (URIs), IP addresses, or other identifiers that describe a user or provide the address of a communication device. The user account may include one or more identifiers for the user.

In one embodiment, when a user is added to a conference call (by, e.g., being called or by calling), the user's name as stored at the server 22 is vocalized to the existing conference call participants. Alternately, the text version of the user's name may be sent to the terminal 16 associated with the existing conference call participants. For example, when user "John Smith" joins or is joined to the conference call, an audio message or audio stream such as "John Smith is joining now." may be sent to all communicators 10. A user joining the conference may be identified at the server 22 by, for example, known caller identification methods, a code (e.g., a voice phrase or a series of DTMF tones), or by other methods. Such identification may be used to determine if a stored identifier is available at the server 22 for the user. Such an identifier may be stored in, for example, a record for the user stored in a database at the server 22; other methods may be used. Such a record may include, for example, a user identification to be sent to conference call users, a data record identifying the user to the server 22 (e.g., a telephone number, a set of DTMF tones), and/or other information. Other methods of identifying users may be used.

Such messages may be transmitted via the mixers 26, or may be sent via other methods. Typically, the audio version of the pre-registered participant is stored at the server 22, but other methods are possible in accordance with embodiments of the present invention. For example, an audio version may be created from a text version stored beforehand or entered at the time of the conference, or an audio version may be entered at the time of the conference and stored at, for example, the server 22.

In one embodiment, a moderator may control some aspects of the communicators 10 or mixers 26, or of a general mixing device used to transmit audio data to communicators. Such a moderator may be, for example, a user associated with a terminal or communicators 10, or may be another party. Such a moderator may communicate with the server 22 via, for example a terminal or communicator 10, or via another method.

For example, a moderator may be able to temporarily block audio signals received by one or more communicators 10 via, for example, sending a signal received at the server 22 which causes the mixers 26, or a general mixing device, to prevent such signals being received. This may act to cause a mute for a set of users. Other moderator control methods may be used; for example, a moderator may control the entry of third parties into the conference call.

In an exemplary embodiment, the mixers 26 (or a general mixing device) may be thought of as processing audio streams for the communicators according to the following formula:

$$Output(a) = mBa*vBa*B + mCa*vCa*C + mDa*vDa*D \ldots + mIa*vIa*I + mIIa*vIIa*II + mIIIa*vIIIa*III+$$

In the above formula, the combination Output(a) of a mixer or set of mixers to a communicator A is the sum of a series of inputs. For each of a set of communicators 10 (A, B, C, D . . . ) and a set of auxiliary inputs (I, II, III . . . ), mXa is the mute control for that input and vXa is the volume control for that input specific to the output calculated, in this case "a". Typically, the auxiliary inputs are not associated with any particular communications device and do not require outputs to a communications device. For example, an auxiliary input which is a recording does not, itself, require an output to a communications device, but may be added as part of a combination output to a communications device. In addition, typically, each user may receive a different set of auxiliary inputs—such capability may be carried out by, for example, simply altering the volume or mix level or mute status for each combination sent to each user.

Note, typically, Output(x) for communicator X does not include inputs from that communicator X. Of course, in implementation, the mute and volume can be implemented as the same functional unit, where mute is simply completely reduced volume, or a zero mix level. Typically, for each communicator input there is an associated output, the output typically sent to the communicator. However, typically, for each auxiliary input, no such output exists.

In one embodiment, the user associated with a particular communicator 10 may control (via methods discussed herein, and typically limited or controlled by the server 22 according to the methods discussed herein) all or a set of the vXy volume control inputs to the Output for any communicator 10 (marked herein as "a"), and may control turning on all or a set of the mAy mute control inputs to the Output for that communicator 10, but may not control turning off the other mXy (other them mAy) mute control inputs to the Output for that or other communicator 10. Typically, a user providing an input may turn on its own mXy mute control for other communicators 10. Thus, a user may control whether or not his or her output is heard by others, and may control the volume of how others are received at the communicator 10 for that user, and may also control the volume levels of other inputs heard at other communicators.

Typically, each stream X may have a variable mix level within and across combinations of streams sent to communicators. For example, within a combination output(x) sent to a communicator, each stream may have a different volume level. Furthermore, a stream X may have a different volume level within each of a set of combinations Output (a . . . n). A stream may not appear in each combination, and may appear in only a subset of combinations (e.g., the volume or mix level of that stream in certain combinations may be zero), and thus each combination need not include all streams.

Typically, but not in every embodiment, a user's control of the volume levels of other inputs is subject to the limits, per the control of server 22, of the various modes and methods described herein. Thus, in some embodiments where the user may be a moderator or an operator, each user or just the moderator may have complete control to control volume levels of other communicators' outputs heard by other communicators as inputs. Typically, a user may not alter, in certain ways, settings relevant to conversations for which the user has restricted permission. For example, a conference participant may not alter settings regarding another user's "whisper" conversation, yet a "whisper" command of a first user to second user may set the second user's mix levels so that second user will hear the incoming whisper from first user in a higher volume level and lower the volume level of other participants. When the whisper ends per the first user (e.g. "unwhisper" command) the system may restore the original levels for the user that received the whisper.

Other formulas or ways of expressing the operation of devices and methods according to embodiments of the present invention may be used.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

The invention claimed is:

1. A conference call server to allow a plurality of communications devices to communicate, the server comprising:

a plurality of mixers configured to receive correspondingly a plurality of incoming audio streams from the plurality of communications devices, and to process the incoming audio streams to output a plurality of combinations of the incoming audio streams, each combination being output to a corresponding one of the plurality of the communications devices; and a controller coupled to the mixers and configured to receive one or more control signals correspondingly associated with one or more of the plurality of communications devices and in response, for one or more of the plurality of combinations, control one or more of the mixers to set one or more mix levels for one or more audio streams within the one or more combinations, including receipt of a first control signal from a first of the communications devices indicating allowance of a first and a second audio stream associated with the first and a second communications device respectively to be included in a first and a second combination for the first and second communications devices respectively but withheld from all other combinations for all other communications devices, and in response, control mix levels of the audio streams in the combinations accordingly.

2. The server according to claim 1, wherein the controller is configured to control a subset of the mixers to set a mix level of a subset of said incoming audio streams for a subset of the combinations, in response to said subset of the incoming audio streams.

3. The server according to claim 1 wherein the controller is configured to, in response to a second control signal associated with the first communications device, control a first mixer to set a first subset of the incoming audio streams which are output to said first communications device to a first volume level and set a second subset of the incoming audio streams which are output to said first communications device to a second volume level.

4. The server according to claim 3 wherein said second control signal associated with the first communications device is received from the first communications device.

5. The server according to claim 3 wherein said second control signal associated with the first communications device is received from a terminal associated with the first communications device.

6. The server according to claim 1 wherein said controller is further configured to receive a control signal from a moderator, and, in response, control a subset of the mixers to alter, for at least a subset of the communications devices, a volume level of a subset of said incoming audio streams which are correspondingly output to said subset of the communications devices.

7. The server according to claim 1, wherein said controller is further configured to control a subset of the mixers to prevent a subset of said communications devices from receiving an in-band audio signaling tone sent by one of said communications devices.

8. The server of claim 1, wherein the server is part of a telecommunications system.

9. The server according to claim 1, wherein said controller is further configured to control one of the mixers to prevent any of said incoming audio streams from being received by one of said communications devices.

10. The server of claim 1, wherein said controller is further configured to selectively control one of the mixers to set a mix level for one of the audio streams for one of the combinations to zero volume.

11. The server according to claim 1 wherein said controller is configured to receive a control signal and, in response, control at least a subset of the mixers to alter, for at least a subset of the combinations for a corresponding subset of the communications devices, a volume level of a subset of said incoming audio streams.

12. A method for allowing a plurality of communications devices to communicate, the method comprising:
   receiving by each of a plurality of mixers, a corresponding plurality of incoming audio streams from the plurality of communications devices, and processing by each of the mixers the incoming audio streams to output a combination of selected ones of said incoming audio streams for a corresponding one of the communications device, wherein each audio stream has a variable mix level within each combination;
   receiving by a controller associated with the mixers a control signal, and in response, controlling one or more of the mixers to set one or more mix levels for one or more audio streams within one or more combinations, including receiving a control signal indicating allowance of a first and a second audio stream associated with a first and a second communications device respectively to be included in a first and a second combination for the first and second communications devices respectively and withhold the first and second audio streams from all other combinations for all other communications devices, and in response, control mix levels of the audio streams in the combinations accordingly.

13. The method according to claim 12, further comprising receiving by the controller a control signal associated with a first communications device, and in response, controlling a first subset of the mixers to set a first subset of the incoming audio streams which are output to said first communications device to a first volume level and set a second subset of the incoming audio streams which are output to said first communications device to a second volume level.

14. The method according to claim 12, further comprising receiving by the controller said control signal associated with the first communications device from the first communications device.

15. The method according to claim 12, further comprising receiving by the controller said control signal associated with the first communications device from a terminal associated with the first communications device.

16. The method according to claim 12, further comprising receiving by the controller a moderator signal and, in response, controlling at least a subset of the mixers to alter, for at least a subset of the communications devices, a volume level of a subset of said incoming audio streams which are output to said subset of the communications devices.

17. The method according to claim 12, further comprising controlling a subset of the mixers, by the controller, to prevent a subset of said communications devices from receiving an in-band audio signaling tone sent by one of said communications devices.

18. The method according to claim 12, further comprising accepting by the controller a control signal from a user and, in response, controlling a mixer to adjust a volume level of one incoming audio stream sent to the communications device associated with that user.

19. The method according to claim 12, further comprising controlling a first of the mixers, by the controller, to prevent any of said incoming audio streams from being received by the first communications devices.

20. The method of claim 12, wherein each audio stream has a variable mix level across the plurality of combinations.

21. The method of claim 12, further comprising controlling a mixer, by the controller, to set a mix level for an audio stream for a combination at zero volume.

22. A conference call server for allowing a plurality of communications devices to communicate, the server comprising:
   a plurality of mixers; and
   a controller coupled to the mixers, and configured to:
      control connecting a first communications device with a first set of communications devices via a conference call; and
      control the mixers to facilitate the conference calls, and enable the first communications device to engage in an associated telecommunications session, during the conference call, with a second communications device not among the first set of communications devices, wherein the controller is configured to control the mixers to selectively mix and combine input audio streams from the first and second communications devices and the first set of communications devices to generate output audio streams for the first and second communications devices and the first set of communications devices, including control of a mixer to allow only the input audio streams from the first communications device be included in the output audio stream for the second communications device, and control the other mixers to allow an input audio stream from the second communications device to be mixed and included in the output audio streams for the first set of communications devices and the first communications device.

23. The server of claim 22, wherein the controller is further configured to control the mixers corresponding to the first set of communications devices to withhold the input audio stream from the first or the second communications device from the output audio streams for the first set of communications devices.

24. The server of claim 22, wherein the controller is configured to control the mixer corresponding to the second communications device to withhold the input audio streams from the first set of communications devices from the output audio stream for the second communications device.

25. The server according to claim 22 wherein the controller is configured to receive a signal associated with a communications device, and in response, set a first set of incoming audio streams which are output to said communications device to a first volume level and set a second set of incoming audio streams which are output to said communications device to a second volume level.

26. The server according to claim 22 wherein the controller is configured to receive a telecommunications session request with the first communications device from the second communications device, and in response to cause the first communications device to be engaged in the associated telecommunications session with the second communications device.

27. The server according to claim 26 wherein the request is a received telephone call.

28. The server according to claim 22 wherein the request includes a code identifying the first communications device.

29. A method of managing a conference call among a plurality of communications devices, the method comprising:
   connecting a first communications device, by a controller, with a first set of communications devices via a conference call, using a plurality of mixers; and
   causing the first communications device by the controller, using another mixer, to engage in an associated telecommunications session, during the conference call, with a second communications device not among the first set of communications devices, wherein the controlling and causing includes controlling the mixers to selectively mix input audio streams from the first and second communications devices and the first plurality of communications devices to generate output streams for the first and second communications devices and the first plurality of communications devices, including controlling a mixer to include only the input audio stream of the first communications device in the output audio stream for the second communications device, and controlling the other mixers to include the input audio stream from the second communications device in the output streams of the first communications device and the first set of communications devices.

30. The method of claim 29, further comprising controlling the mixers corresponding to the first set of communications devices, by the controller, to withhold the input audio stream of the first or second communications devices from the output audio streams of the first set of communications devices.

31. The method of claim 29, further comprising controlling a mixer corresponding to the second communications device, by the controller, to include audio streams of the first set of communications devices and the first communications device in the output audio stream for the second communications device.

32. The method according to claim 29, further comprising receiving by the controller, a control signal, and in response, controlling one or more mixers to set a first subset of incoming audio streams which are output to said first communications device to a first volume level and setting a second subset of incoming audio streams which are output to said first communications device to a second volume level.

33. The method of claim 29, further comprising receiving a telecommunications session request from the second communications device to engage in the associated telecommunications session with the first communications device.

34. The method according to claim 33, wherein the request is a received telephone call.

35. The method according to claim 33, wherein the request includes a code identifying the first communications device.

36. The server of claim 1 wherein the controller is further configured to control the mixers to receive an auxiliary audio stream and to add the auxiliary audio stream to one or more of the combinations for one or more of the communications devices.

37. The server of claim 36, wherein each mixer includes at least an auxiliary audio input coupled to the controller.

38. The server of claim 36, wherein the auxiliary audio stream is received from another device other than the communications devices.

39. The server of claim 36, wherein the auxiliary audio stream is a pre-recorded audio stream.

40. The server of claim 36 wherein said auxiliary audio stream includes a continuous stream input received from a device external to the server.

41. The server according to claim 36 wherein the controller is further configured to pause a transmission of the auxiliary audio stream.

42. The server of claim 36, wherein the controller is further configured to receive a control signal, and, in response, control one or more of the mixers to alter a play speed of the auxiliary audio stream.

\* \* \* \* \*